(12) United States Patent
Risque et al.

(10) Patent No.: US 11,995,822 B2
(45) Date of Patent: May 28, 2024

(54) PLANT MONITORING SERVER, A PLANT MONITORING SYSTEM AND A PLANT MONITORING TERMINAL DEVICE

(71) Applicant: Canon Virginia, Inc., Newport News, VA (US)

(72) Inventors: Paul Lowry Risque, Williamsburg, VA (US); Hunter Orrell, Newport News, VA (US); Thomas Wheeless, Hampton, VA (US)

(73) Assignee: Canon Virginia, Inc., Newport News, VA (US)

( * ) Notice: Subject to any disclaimer, the term of this patent is extended or adjusted under 35 U.S.C. 154(b) by 370 days.

(21) Appl. No.: 17/374,736

(22) Filed: Jul. 13, 2021

(65) Prior Publication Data

US 2022/0020148 A1   Jan. 20, 2022

Related U.S. Application Data

(60) Provisional application No. 63/051,762, filed on Jul. 14, 2020.

(51) Int. Cl.
*G06T 7/00* (2017.01)
*A01G 9/02* (2018.01)
*A01G 9/26* (2006.01)
*G06F 3/04817* (2022.01)

(52) U.S. Cl.
CPC ............ *G06T 7/0012* (2013.01); *A01G 9/022* (2013.01); *A01G 9/26* (2013.01); *G06F 3/04817* (2013.01); *G06T 2207/30188* (2013.01)

(58) Field of Classification Search
CPC ......... G06T 7/0012; G06T 2207/30188; G06T 2207/20081; G06T 2207/20084; G06T 7/0004; A01G 9/022; A01G 9/26; A01G 31/06; G06F 3/04817; G06F 3/04847; Y02A 40/25; Y02P 60/21
See application file for complete search history.

(56) References Cited

U.S. PATENT DOCUMENTS

| 2006/0036568 | A1* | 2/2006 | Moore | G06F 16/168 |
| 2018/0295783 | A1* | 10/2018 | Alexander | B25J 9/1679 |
| 2018/0359901 | A1* | 12/2018 | Millar | A01B 41/04 |

* cited by examiner

*Primary Examiner* — Jianxun Yang
(74) *Attorney, Agent, or Firm* — Canon U.S.A., Inc., IP Division

(57) ABSTRACT

A terminal device is provided and is configured to display, on a first screen, a first number of one or more fields where one or more defective plants are detected, change a displayed screen from the first screen to a second screen, in a case where an instruction to change a screen is received, wherein one or more pictures of plants in a first field is displayed on the second screen, display, on a second screen, a second number of a field where one or more defective plants are detected, wherein the second number is less than the first number; and display, on the second screen, an user interface to instruct to change a displayed screen from the second screen to a third screen, wherein one or more pictures of plants in a second field is displayed on the second screen.

7 Claims, 32 Drawing Sheets

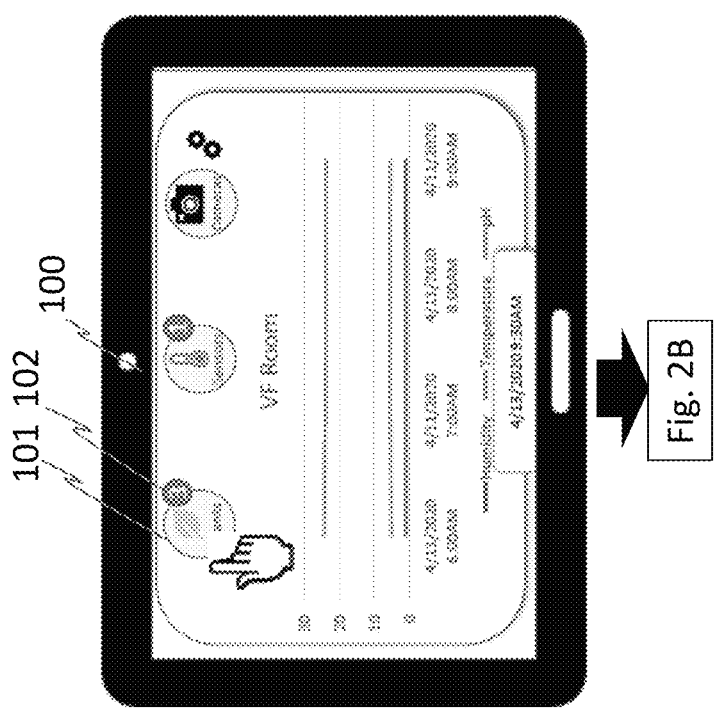

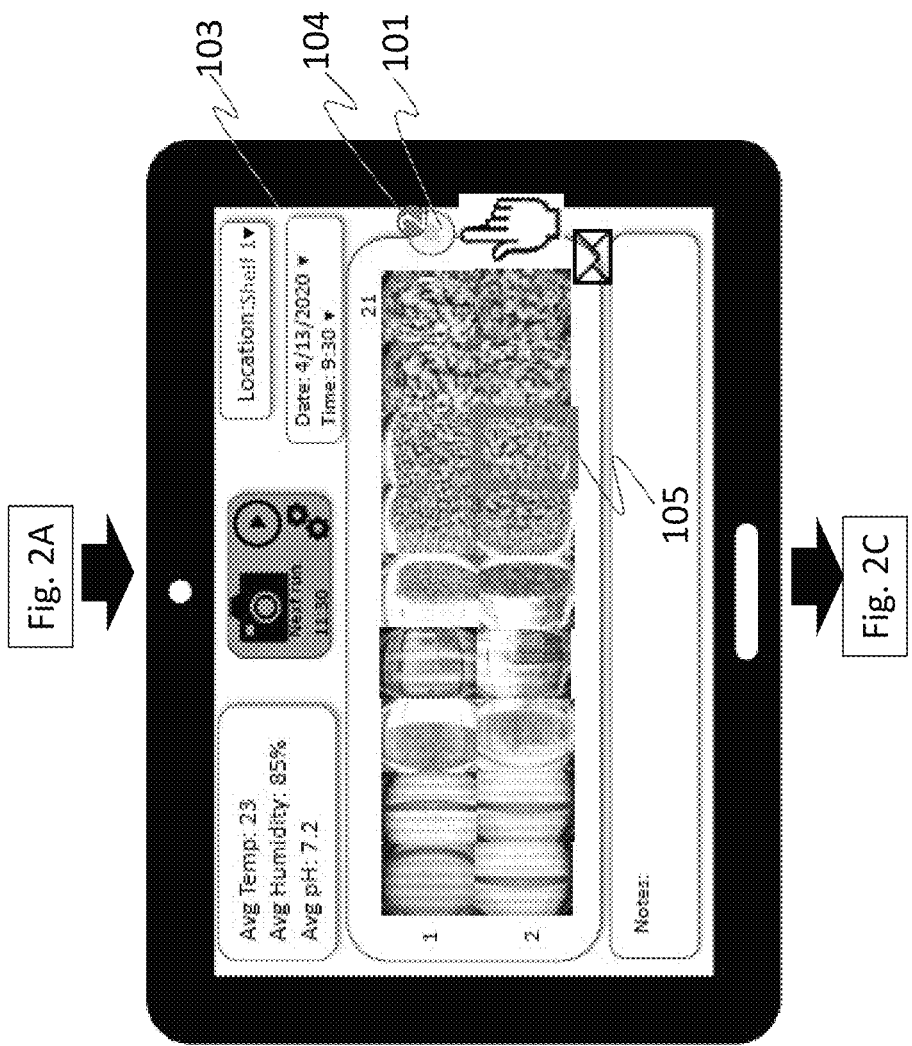

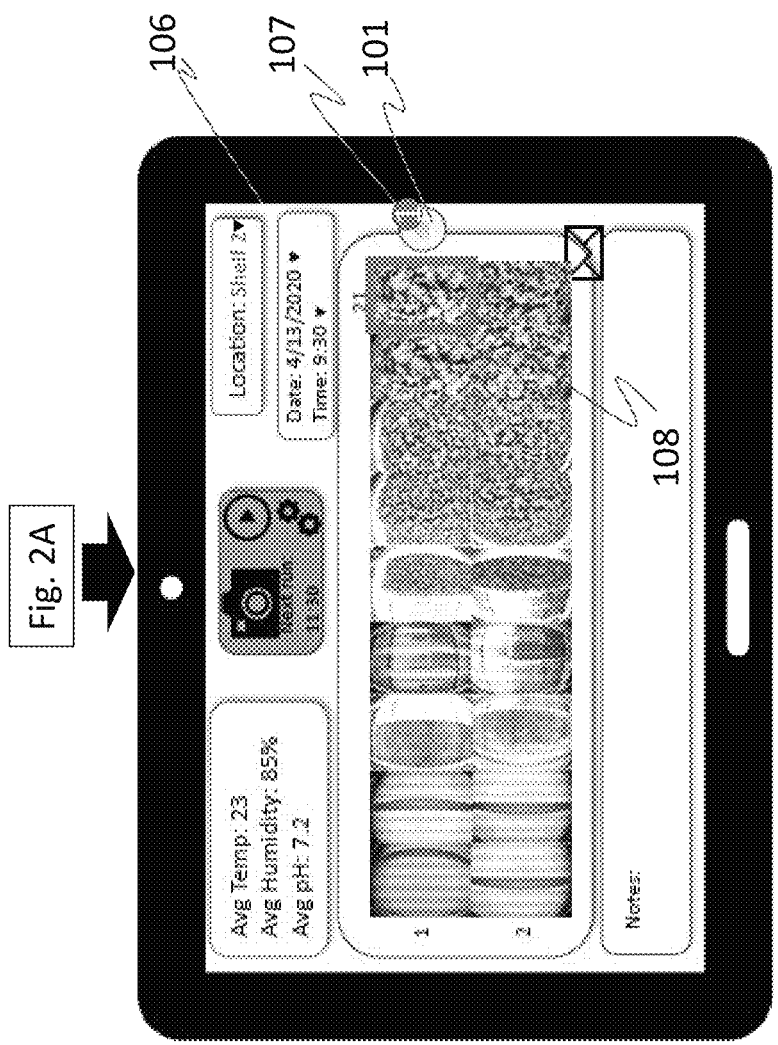

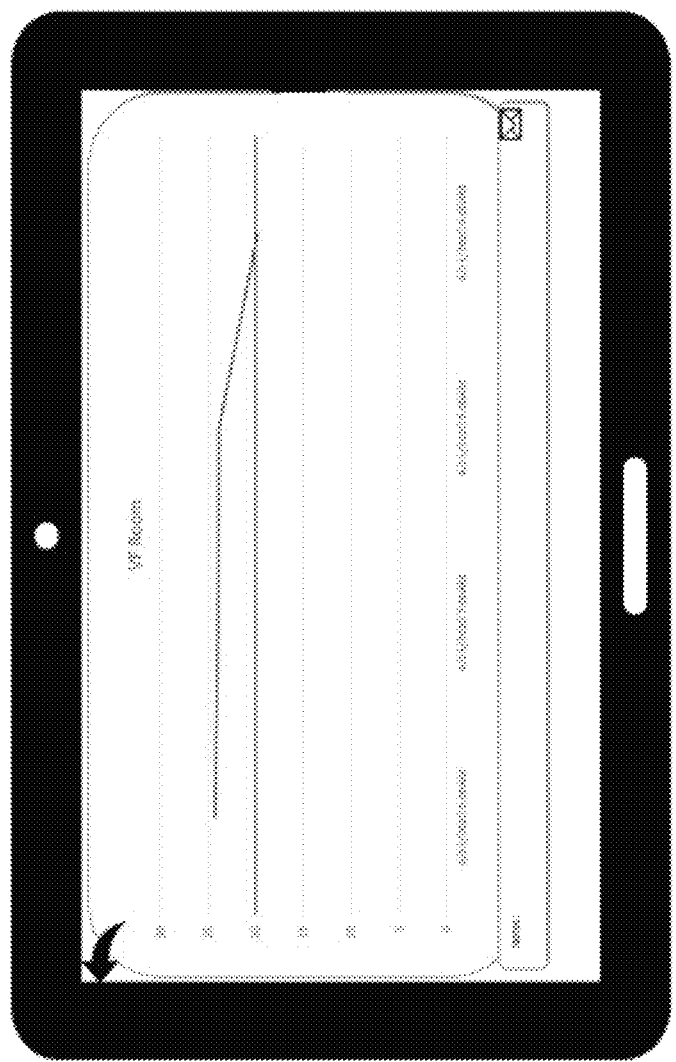
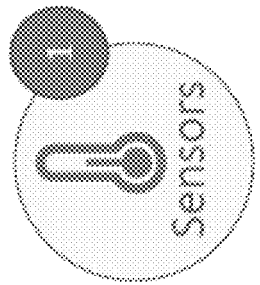
Fig. 14

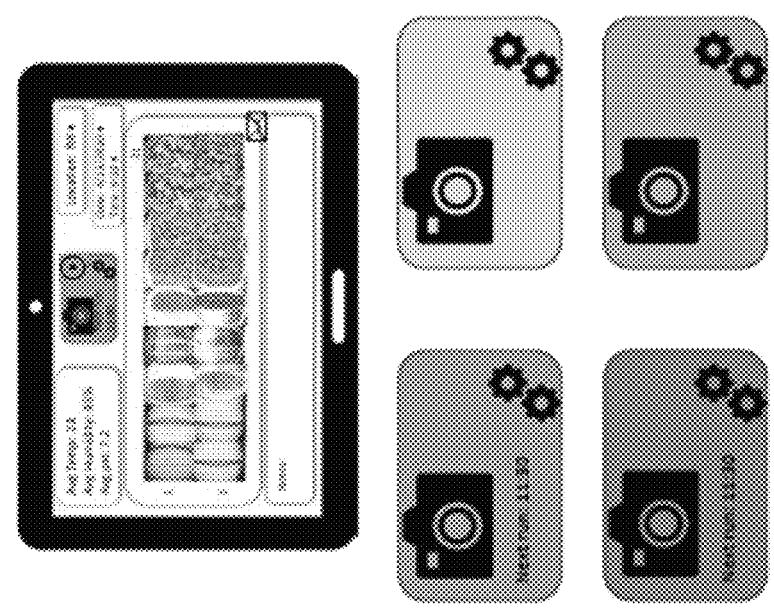
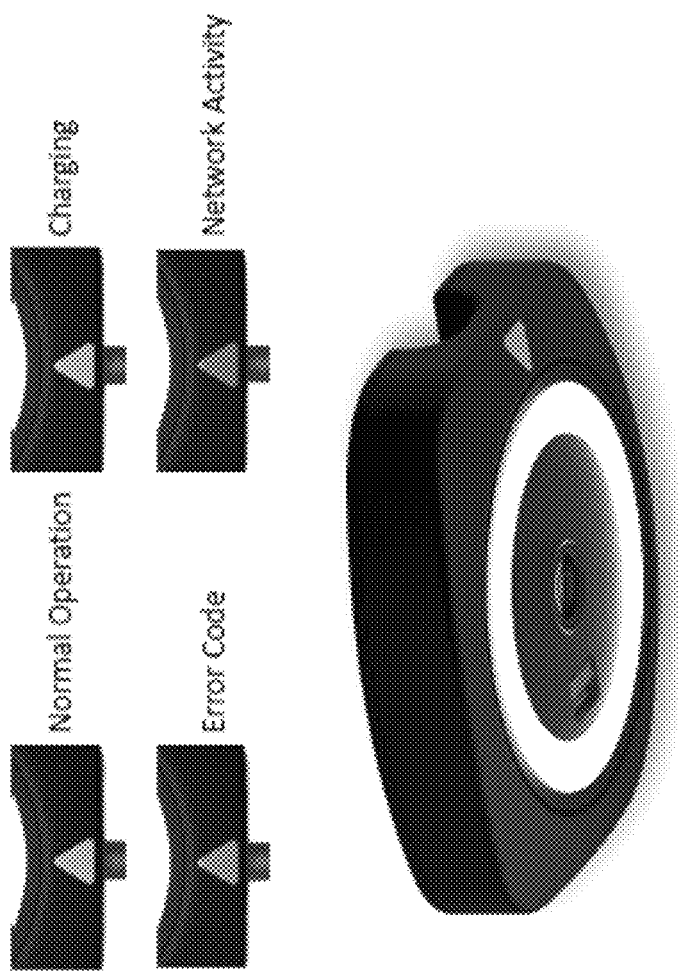
Fig. 23

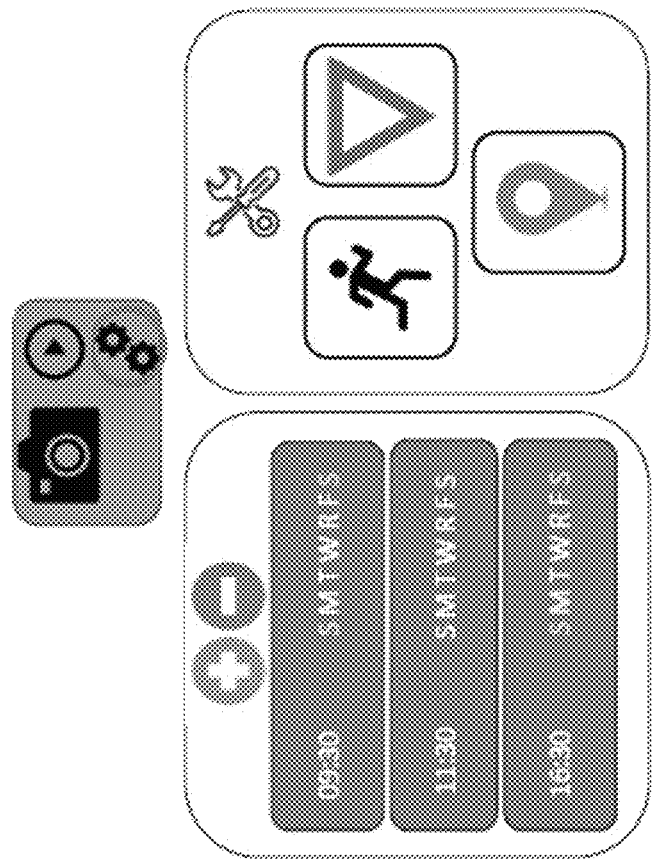
Fig. 25

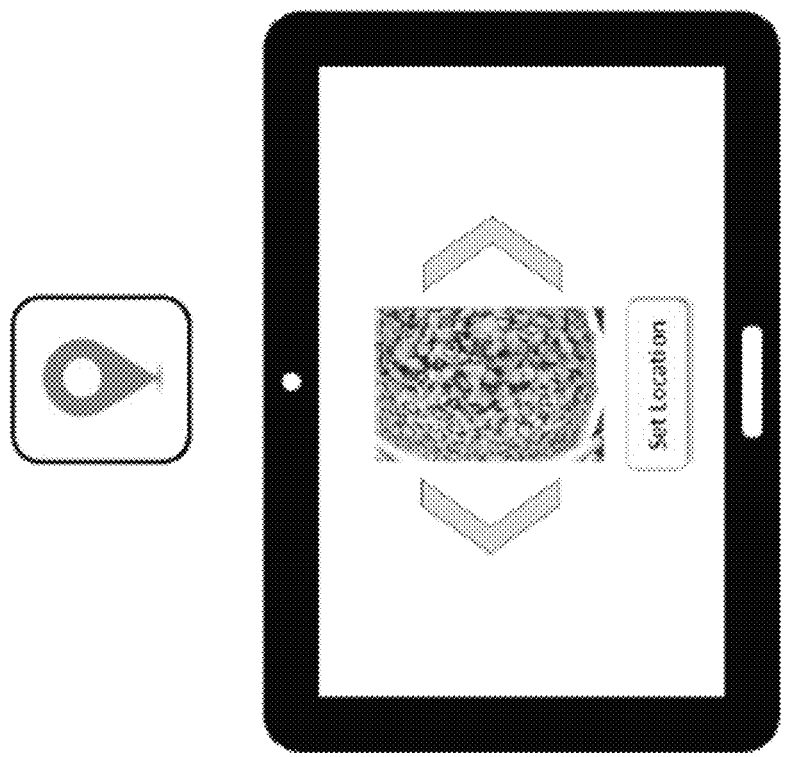
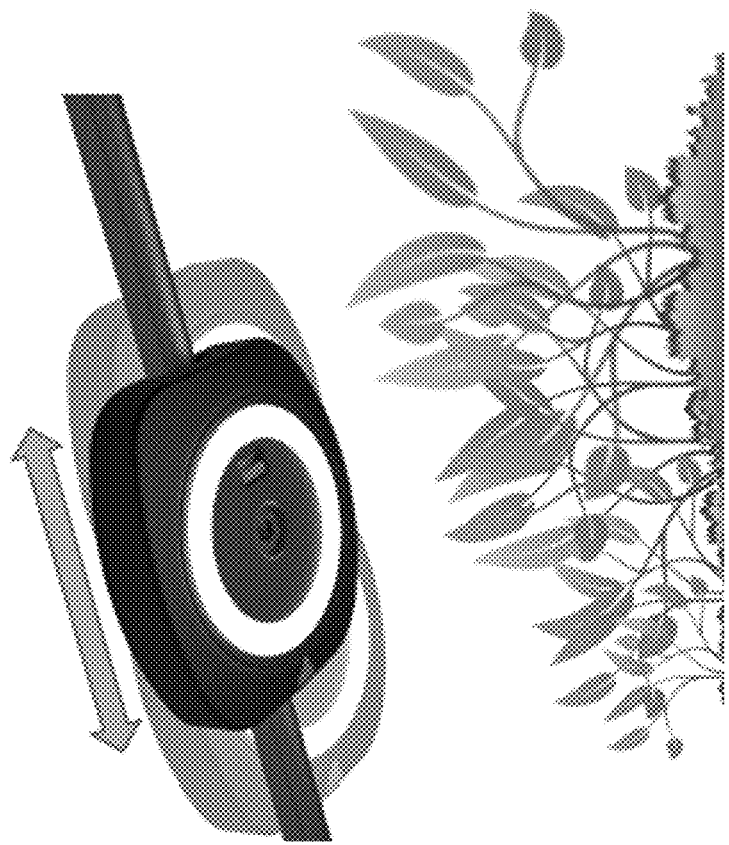
Fig. 26

PLANT MONITORING SERVER, A PLANT MONITORING SYSTEM AND A PLANT MONITORING TERMINAL DEVICE

CROSS-REFERENCE TO RELATED APPLICATIONS

This application claims the benefit of priority of U.S. Provisional Patent Application Ser. No. 63/051,762 filed on Jul. 14, 2020, the entirety of which is incorporated herein by reference.

BACKGROUND

Field

The present disclosure relates generally to image processing and, more specifically, detection and identification of plants in a vertical farming environment.

Description of Related Art

Vertical farming is the process by which plants are grown in a plurality of trays stacked vertically in order to maximize space and increase the amount of plants able to be grown in a certain area. Typically, the plants are grown in carefully controlled environmental conditions in order to ensure maximum yield. However, as is the case with conventional farming, inspection of the plants is needed to ensure that the plants are healthy and free from diseases. More specifically, human operators need to physically analyze a growing tray to identify any diseased or "bad" plants (or leaves of the plants) and to monitor the changing health of the plants in the tray. This work flow is hard to scale because as you grow more plants you must also hire more operators to inspect and keep track of plant health and condition.

Human inspection presents a unique difficulty in the vertical farming environment because the structures that hold the trays tend to extend upward at heights that make it difficult for direct human inspection. One attempt at resolving these drawbacks in monitoring and maintaining the health of plants in a vertical farm include mounting and positioning of image capture devices. Complicating this workflow is the manner in which the captured images are presented to those charged with inspecting and evaluating the health of the plants. A need therefore exists to enable the evaluation of newly detected plant defects and quickly identify the location within specific grow trays from among a plurality if grow trays in a vertical farm setup.

SUMMARY

The above drawbacks are remedied by the disclosed a plant detection and display system.

In one embodiment, a server is provided and is configured to receive, from a first camera, one or more captured images captured by the first camera, wherein the first camera captures images of plants contained by one or more trays in a first field. The server receives, from a second camera, one or more captured images captured by the second camera, wherein the second camera captures images of plants contained by one or more trays in a second field and detects a defective plant based on the images received from the first camera and the second camera. The server stores, in memory, a number of a trays containing one or more defective plants in a case where a new tray containing a defective plant is detected. The server notifies the increased number of the tray containing one or more defective plants to a terminal device and stores, in a stack or a queue, identification information corresponding to a field where the defective plant is detected. The server receives, from the terminal device, a request for captured images of a field where defective plants are detected and reads, from the stack or the queue, one of the identification information corresponding to a field in a case where the request is received and decreases the number of the trays containing one or more defective in response to the reading of the identification information from the stack or the queue and transmits, to the terminal device, one or more captured image of plants in a field corresponding to the read identification information and the decreased number of the trays containing defective plant.

In another embodiment, a terminal device is provided and is configured to display, on a first screen, a first number of one or more fields where one or more defective plants are detected, change a displayed screen from the first screen to a second screen, in a case where an instruction to change a screen is received, wherein one or more pictures of plants in a first field is displayed on the second screen, display, on a second screen, a second number of a field where one or more defective plants are detected, wherein the second number is less than the first number; and display, on the second screen, an user interface to instruct to change a displayed screen from the second screen to a third screen, wherein one or more pictures of plants in a second field is displayed on the second screen.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIGS. 2A-2C illustrate user interfaces displayed on a terminal device.

FIGS. 13-27 illustrate various graphical user interfaces generated for display on a terminal device which provide information associated with the grow environments and plant trays therein Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

Figure 1:
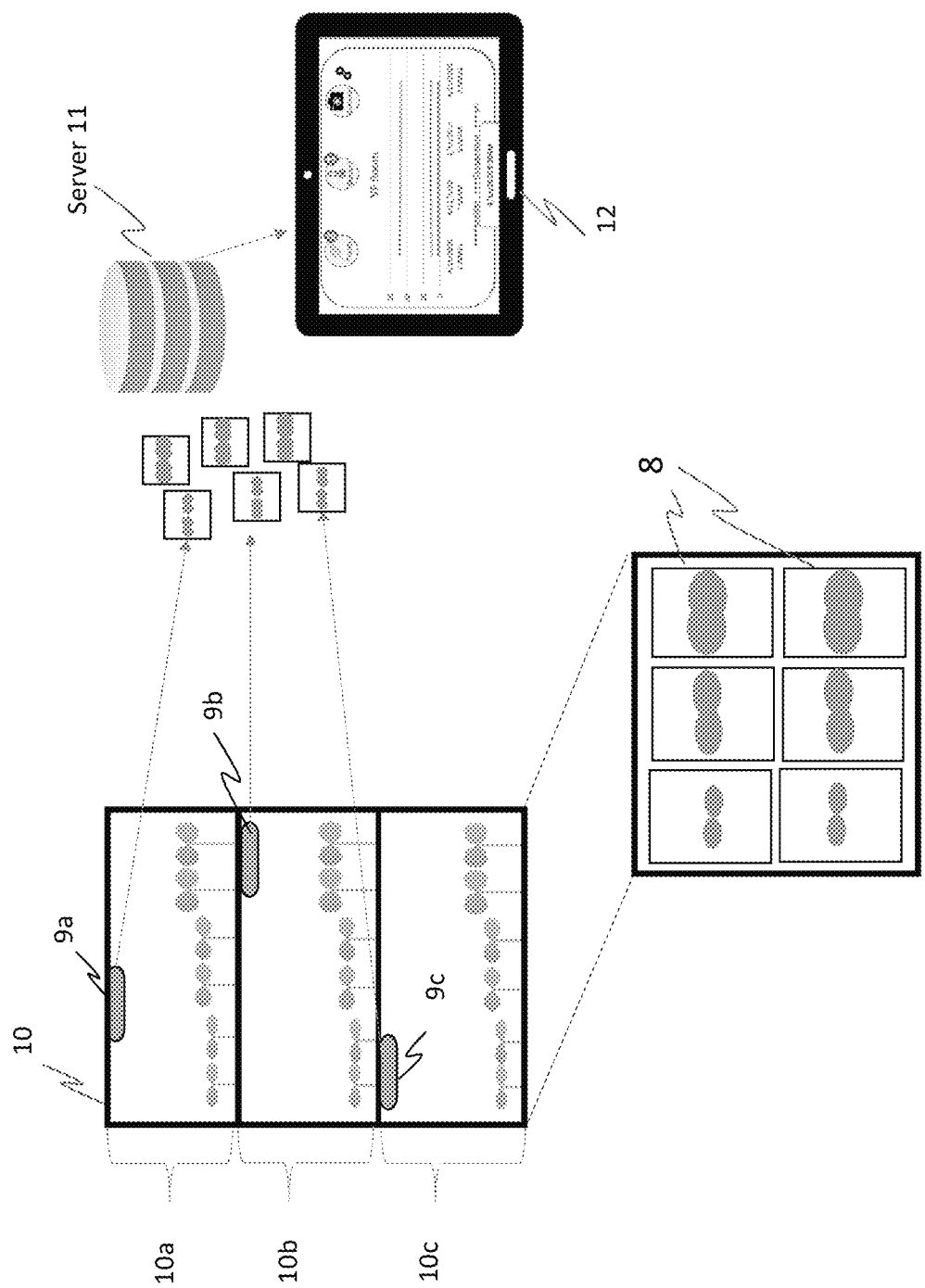
FIG. 1 illustrates the plant detection and display system.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

Described herein is a system for analyzing and detecting defective plants during the growing process. In one embodiment, the system described herein is deployed a vertical farming environment where a series of plants are being grown in a plurality of vertically stacked grow tray. Plants are living and always changing objects that must meet a certain quality check to be considered ok to harvest and sell. This quality check is currently done by human workers who must look at every single leaf to determine where issues such as mold or disease are occurring. This means growing facilities must spend additional money as they scale to analyze and monitor their plants health. The system according to the present disclosure improves the ability to both identify damaged or defective leaves by using machine learning model which has the improved ability to identify, from within a tray of a plurality of plants having a plurality of leaves, which of these leaves are defective. In so doing the system advantageously enables health-tracking of plants over a period of time while considering any environmental factors present at the growing facility and improving the manner in which suspect plants that may or may not be defective are presented to persons in charge of properly evaluating the health of plants. The present disclosure advantageously generates user interfaces that are particular to a vertical farming environments such that the information conveyed to the user are targeted to allow for quick and correct evaluation of plant conditions from within the user interface. The identification of potentially defective plants and the proper presentation of these plants to evaluation personal presents specific challenges that are remedied by the user interface generation and workflow described herein. More specifically, the advancement presented by vertical farming is the ability to increase an amount of plants able to be grown in a particular defined space. As such, there are more potentially defective plants to be analyzed. Further, the size and density of plants in a given tray make is difficult to not only identify potentially defective plants but also to visualize and confirm a detected result. The present disclosure takes into account the grow trays and their density to generate a proper transition between various user interfaces that allows for more precise identification and confirmation of detection results that identify potentially defective plants growing in grow trays in a vertical farm stack.

FIG. 1 depicts an exemplary vertical farming environment and plant detection system that advantageously generates user interfaces. A cultivation facility represents a vertical farming environment. As shown herein, the facility includes one or more vertical farming stacks 10 where each stack includes plurality of shelves 10a, 10b, 10c stacked vertically. Each shelf includes one or more grow trays 8 where plants are grown. This is illustrated in the exemplary overhead view of shelf 10c. This makes possible to grow large amount of plants in a small area. The degree of growth of plants may differ depending on the particular tray 8. One or more cameras 9a, 9b, 9c are installed for each shelves. Each camera 9a, 9b, 9c can move and captures images of the trays 8 on respective shelves 10 from above the plants. The image captured by the cameras 9a, 9b, 9c are transmitted to a server 11 which stores the images sent from the cameras 9a, 9b, 9c. The server 11 includes one or more sets of executable instructions that use, as inputs, the captured images to perform one or more defect detection algorithms that detect potential defects of plants based on the plant images stored at server 11. When the server 11 detects a plant defect, the server 11 generates and transmits push notification to a plant monitoring application which is installed on a terminal device 12. The plant monitoring application generates one more user interfaces that are displayed on a display of terminal device 12 displays a number of the push notifications received from the server 11 as an alert icon on a plants icon.

The illustration of the farming environment shown in FIG. 1 is provided to illustrate the components thereof. It should be understood that, as is a normal purpose and effect of vertical farming, that the present disclosure presumes one or more vertical farming facility and, in each of the one or more vertical farming facilities, a plurality of stacks of grow trays are present. Moreover, while FIG. 1 illustrates a vertical stack with three grow trays, it should be understood that any number of trays and associated cameras to perform image capture is contemplated and the limits thereof are only based on size of plants being grown and capacity of the indoor vertical farm.

A problem with vertical farming environments is that growers need to check, in a short time, an existence of newly detected plant defects and wants to know the tray where the plants identified as defective are detected. If a user interfaces includes a single image of all shelves are displayed at once when a grower clicks an icon on which an alert is displayed, it will be difficult for a user to see the status of the plants. These issues are particularly pronounced when the pictures are displayed on a small display device such as mobile tablets or mobile phones. More specifically, in view of the density of plants in a particular tray and size of the individual plants within the particular tray, when a collective image of trays with defective plants are shown it is difficult for a grower to actually determine if the plants detected as being defective are actually defective.

A system according to the present disclosure remedies the above identified problems in a vertical farming environment as illustrated in FIGS. 2A-2C. A home screen 100 displays an overview of a status of the plant shelves as shown in FIG. 2A. A plants icon 101 is displayed in the home screen 100. The information presented on the home screen 101 is obtained from the server 11 in FIG. 1. A plant icon 101 is an icon (e.g. user selectable image elements displayed on a graphical user interface) which is selectable by a user to instruct a plant monitoring software to obtain from and display captured images of the plants from server 11. In a case where a defect detection algorithm executing on server 11 determines that a new detection results is present indicating that plant defects exist, an alert icon 102 is displayed on the plants icon 101. The alert icon 102 includes an alert indicator representing number displayed therein that indicates a number of trays in which defective plant(s) are detected. In another other embodiment, the alert indicator may represent a number of shelves in which defective plant(s) are detected. If the user selects the plants icon 101 in the home screen 100, a first plant view 103 is displayed as shown in FIG. 2B. In the first plant view screen 103 of FIG. 2B, captured images of one of a plurality of shelves is displayed. In the first plant view screen 103, a frame 105 is displayed around a tray in which plant defect is detected. In addition, the plant icon 101 and an alert icon 104 is displayed in the first plant view screen 103. This makes it possible for a user to change a screen smoothly from the first plant view screen 103 to the second plant view screen 106, as shown in FIG. 2C, without going back to the home screen 100. The number displayed in the alert icon 104 becomes less than the number displayed in the alert icon 102. If the user clicks the plants icon 101 in the first plant view screen 103 of FIG. 2, the second plant view 106 is displayed as shown in FIG. 2C. In the second plant view screen 106, captured images of another shelf in which a plant defect is detected is displayed. Similar to the first plant view screen 103, a frame 108 and an alert icon 107 is displayed in the second screen 106. The number displayed in the alert icon 107 becomes less than the number displayed in the alert icon 104. The user interfaces generated herein advantageously provide an easy means a user to see the status of the plants because pictures are displayed shelf by shelf. Further, the selection and dynamic modification of the plant indicators allow for smoothly change the displayed screen smoothly to see a status of next shelf in which a plant defect is detected because an icon to instruct a screen transition and a number of un-shown plant defects are displayed not only in the home screen but also in the plant view screen.

Additionally, as shown in FIGS. 2A-2C, ancillary grow environment information is displayed along with the images of the individual trays determined to have one or more defective plants therein. In one embodiment, the dashboard shown in FIG. 2A illustrates a time series information that represents on or more characteristics of the plants being grown over the entirety of a growing facility. For example, FIG. 2A illustrates a graphical representation, over time, of humidity, temperature and pH. In the plant screens shown in FIGS. 2B and 2C, additional ancillary information is displayed including, but not limited to, average temperature, humidity and pH. In one embodiment, the ancillary information is facility specific information representing conditions propagated throughout the facility. In another embodiment, the ancillary information is shelf specific representing conditions at the shelf being visualized. In a further embodiment, the ancillary information is tray specific representing conditions within the particular tray that is highlighted by the frame indicating that a plant may be defective. Also shown in FIGS. 2B and 2C are camera processing information which provide information identifying a last capture of the shelf and/or a next capture identifying when a next image capture will be performed. Also, provided is shelf identification information identifying the shelf location of the image being displayed on the terminal device.

Figure 3B:
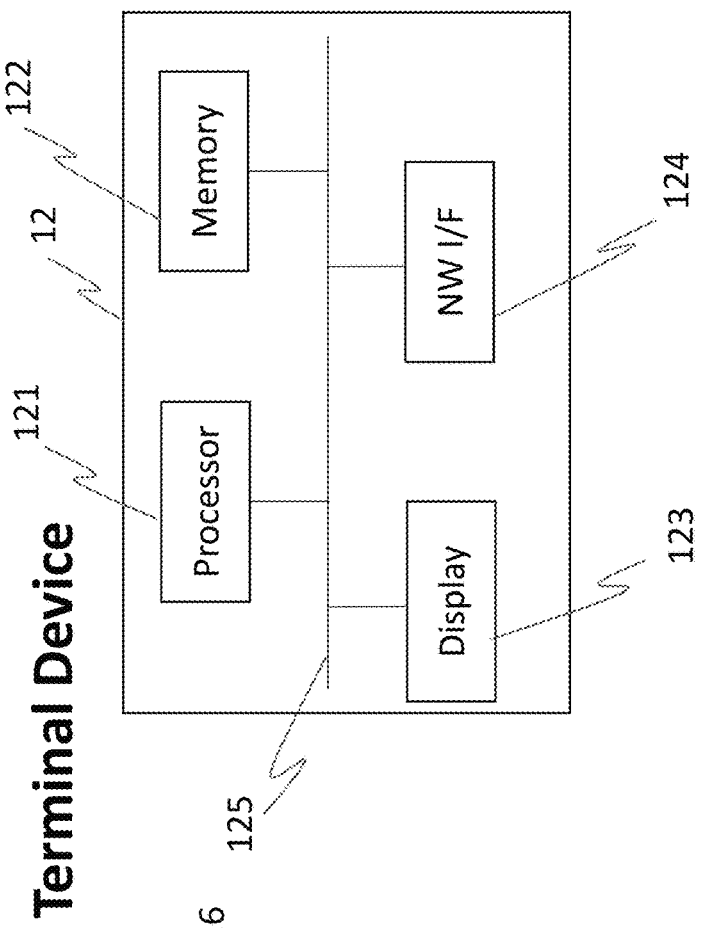
FIGS. 3A & 3B are a block diagram detailing the hardware components of a server and terminal device, respectively.
Figure 3A:
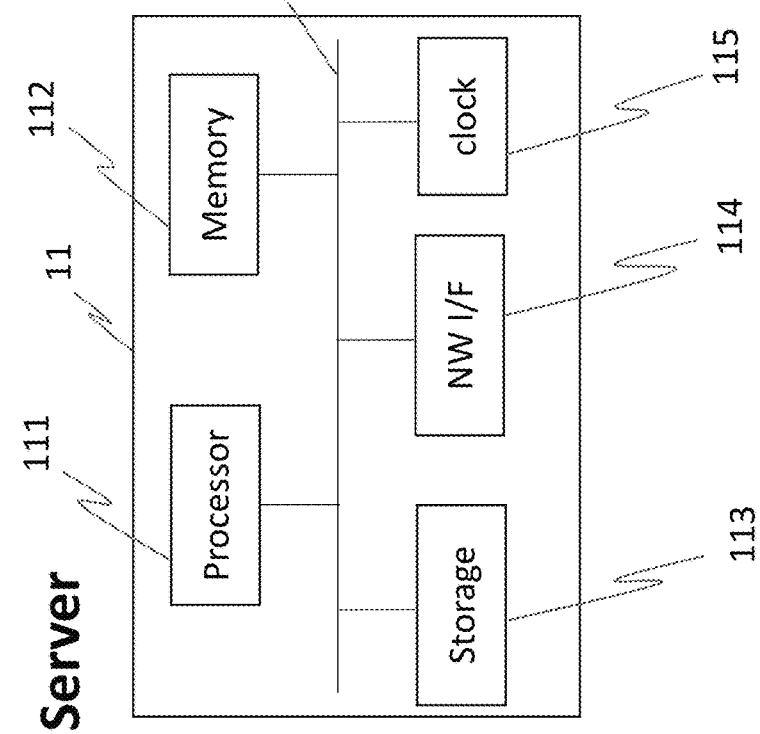

FIGS. 3A and 3B are block diagrams of the hardware components of each of the server 11 and terminal device 12, respectively, which implement the detection and display processing described through the present disclosure. FIG. 3A illustrates the server 11 which includes one or more processors 111, one or more memories 112, storage 113, Network interface (NW I/F) 114 and clock 115. The NW I/F 114 is an interface to communicate with the cameras and the terminal device 12. Wired or wireless networks can be used. The storage 113 stores captured image sent from cameras and other image capture programs. The processor 111 executes the a program which is read from the storage and performed in the memory 112 and controls each of the units in the server 11. The clock 115 measures time.

The terminal device 12 includes one or more processors 121, one or more memories 122, a display 123 and NW IF 124. The NW I/F 124 is an interface to communicate with the server 11. Wired or wireless networks can be used. The processor 121 executes the program which is stored in the memory 122 and controls each of the units in the terminal device 12. The display 123 displays one or more graphical user interfaces according to the control by the processor 121. The display 123 can be touch screen that can input instruction from a user by touch operations from the user. In one embodiment the terminal 12 is a smart phone or tablet. In another embodiment, the terminal is a portable computing device such as a laptop or a desktop computing device.

Figure 4:
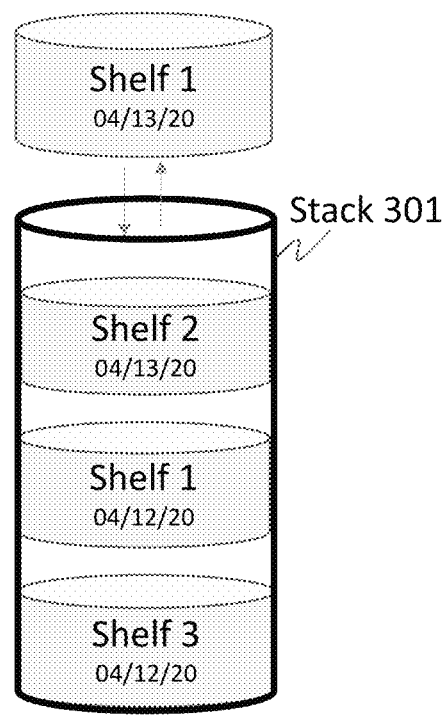
FIG. 4 illustrates an exemplary grow tray stack.
Figure 5A:
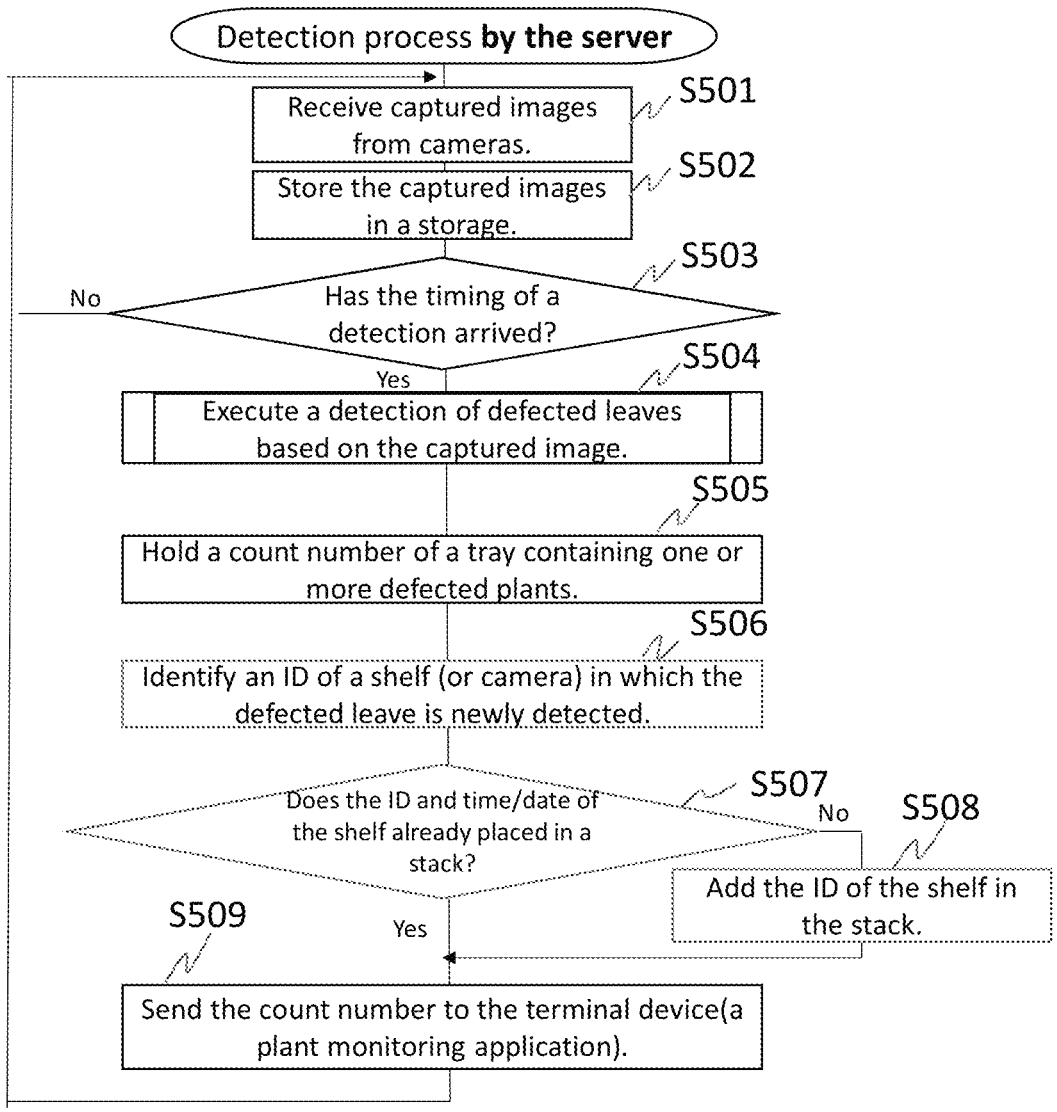
FIGS. 5A & 5B are flow diagrams of an exemplary detection and display algorithm.
Figure 5B:
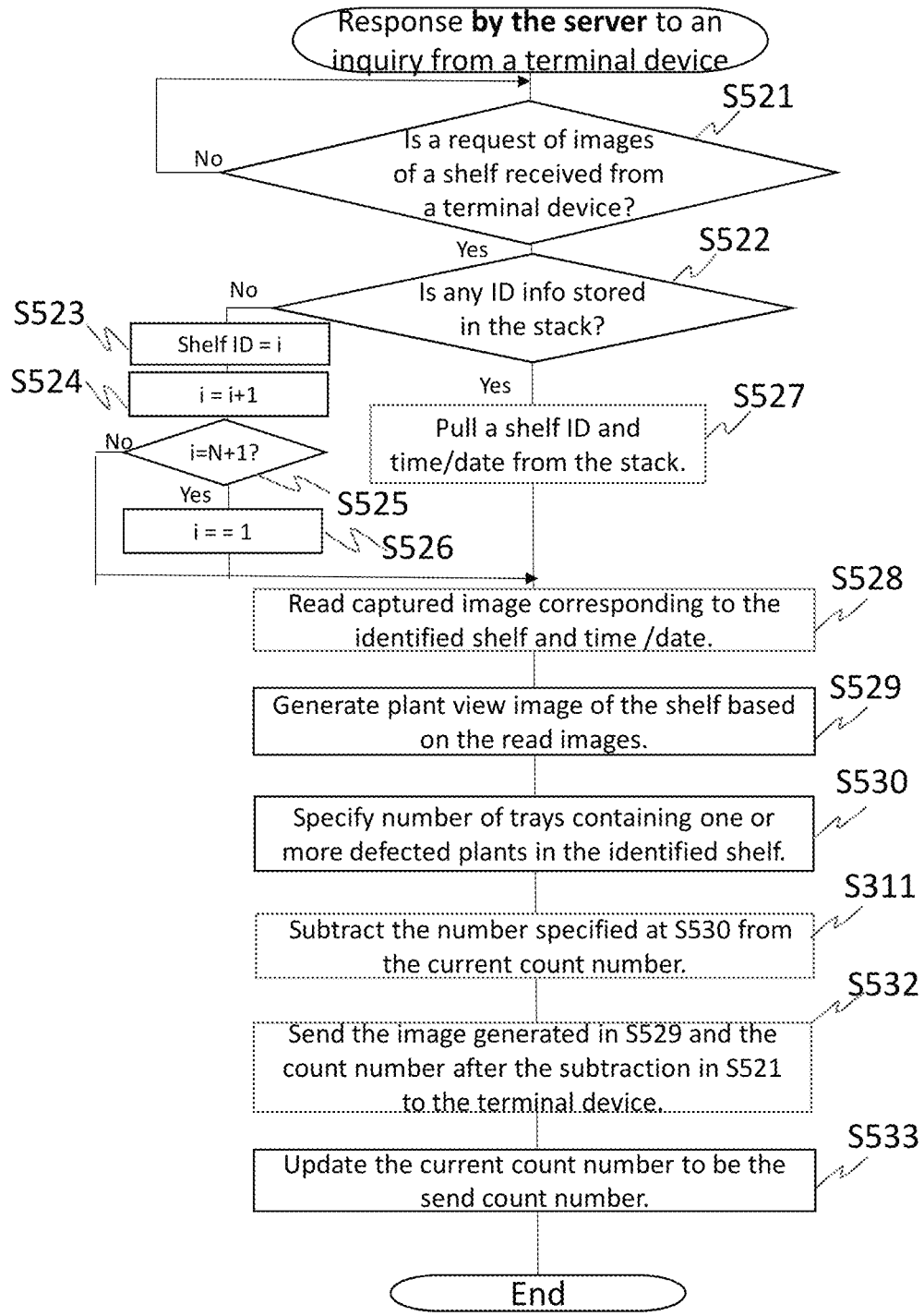

FIG. 4 illustrates an exemplary stack 301 of grow trays in a vertical farm environment. FIGS. 5A and 5B illustrate an embodiment of the plant detection and display system according to the present disclosure. FIGS. 5A & 5B are a flow diagram detailing the steps of the algorithm executed by the one or more processors of the server 11, in FIG. 5A and the terminal device 12, in FIG. 5B. The executed processing steps communicate with and obtain information from the shelves of the stack 301 shown in FIG. 4 in the manner discussed below.

The detection process and a response to an inquiry from a terminal device 12 by the server 11 is described below. The steps S501 to S509 and S521 to S531 are realized by the processor 111 by executing instructions (program) stored in the memory 112 or storage 113.

In step S501, the server 11 receives captured images of plants from camera 1, 2 and 3 (FIG. 1) via the NW I/F 114. The captured images are transmitted to the server 11 in response to receipt of an instruction for capturing an image. The captured images may be provided at predetermined time intervals comes or when a request from the server 11 is received. The server 11 also receives from a camera time information indicating time when the captured image is captured and position information about where the captured image is captured. The position information indicates a positon or identification information of a tray of which captured image is captured.

In step S502, the server 11 stores the received images in a storage 113 of the server 11. In this embodiment, the received images are stored in a storage area that contains images that were captured by the cameras but have not had any defect detection performed thereon. The storage 113 stores each of the images in relation with identification information of a tray. The identification information of tray may be ID number, name of the tray or positional information representing a position of the tray within a particular stack and/or position of the stack within a particular grow facility.

In step S503, the processor 111 determines a current time is equal to a predetermined time at which defect detection on images of leaves is to be performed. The predetermined timing may be a predetermined time during each day, for example. The processor 111 can determine the timing by acquiring time information from clock 115. Alternatively, the processor 111 may determine that the timing has arrived if a predetermined time has passed since previous defect detection was performed. In another embodiment, the predetermined timing may indicate receipt of a detection instruction from a user. This may occur, for example, via selection on a user interface being displayed on the terminal device 12 which is in communication with server 11.

If it is determined that the timing of the detection has not arrived, the processor 111 returns to step S501. If it is determined that the timing has arrived, in S504, the processer 111 executes a detection algorithm to detect defects on leaves based on the captured image stored in the storage area 113 where images are stored, as captured by the cameras and before detection processing. An exemplary algorithm for performing defect detection is described herein after with respect to FIGS. 10-12 After a defect detection is performed, the images are moved to a storage area within storage 113 that stores images on which defect detection has been performed.

If the detection is completed, in step S505, the processor 111 stores a count number of a tray containing one or more plants determined to contain defects based on a result of the detection. In step S506, the processor 111 obtain identification information (ID) of a shelf in which a defective plant is newly detected. In another embodiment, the processor 111 may identify the plants by obtaining an ID of camera instead of identification information of a shelf.

In step S507, the processor 111 determines whether a set of detected ID and detection date and/or time of defective plant is stored in a stack 301 of FIG. 4. The stack 301 in FIG. 4 is a Last In First out (LIFO) data pipe line. However, a queue (First In First Out data pipe line) may be used instead of the stack 301. If the set of the detected ID and detection date and/or time is not stored in the stack 301, the processor 111 proceeds to step S508. If the set of the detected ID and detection date and/or time is already stored in the stack 301, the processor 111 proceeds to step S509.

In the step S508, the processor 111 inputs the set of the detected ID and detection date and/or time in the stack 301. Then the processor 111 proceeds to step S509.

In step S509, the processor 111 controls NW I/F 114 and sends the count number held in the step S505 to the terminal device. Then the processor 111 returns to step S501. The count number sent in step S509 indicates a number of trays containing defective plants in all shelves and is displayed as the alert icon 502 on the home screen 500 of the terminal device 12. By executing step S501 to S509, a number of shelves containing defective plants is transmitted from the server 11 to the terminal device 122. By executing step S501 to S509, a set of ID of shelf in which defective plant is detected and detection date and/or time is stored in a stack 301.

FIG. 5B illustrates, in step S521 to S532, a flow diagram representing a response by a server 11 to an inquiry from a terminal device 12. In step S521, the processor 111 determines whether a request of images of a shelf is received from the terminal device 12. The processer 111 repeats S521 until the request is received. If the request is received, the processor 111 proceeds to step S522. In step S522, the processor 111 determines whether any ID information stored in the stack 301. If ID information is stored in the stack 301, the processor 111 pulls the ID information from the stack 301 in step S527. If any ID information is not stored in the stack 301, the processor 111 performs step S523 to S526.

In step S523, "i" is set as shelf ID. In this embodiment, an initial value of "i" is 1. For example, if "i" is equal to 1, captured images of shelf 1 is read from the storage 113 in the S528. In step S524, "i" is increased. For example, if "i" is equal to 1, "i" is increased to be "2". Then captured images of shelf 2 is read from the storage 113 in the S529 when next request for images of a shelf is received. In step S525, processor 111 determines whether "i" reaches N+1. N is a number of shelves in a set of shelves. If "i" has not reached N+1, the processor 111 proceeds to step S528. If "i" has reached N+1, then the processor 111 initializes "i" to be 1. In step S528, the processor 111 reads, from the storage 113, captured images corresponding to the shelf ID specified in step S523 or S527. The processor 111 reads captured images from the storage area 113 for images on which defect detection has been performed as described after with respect to FIGS. 10-12 done.

Figure 10:
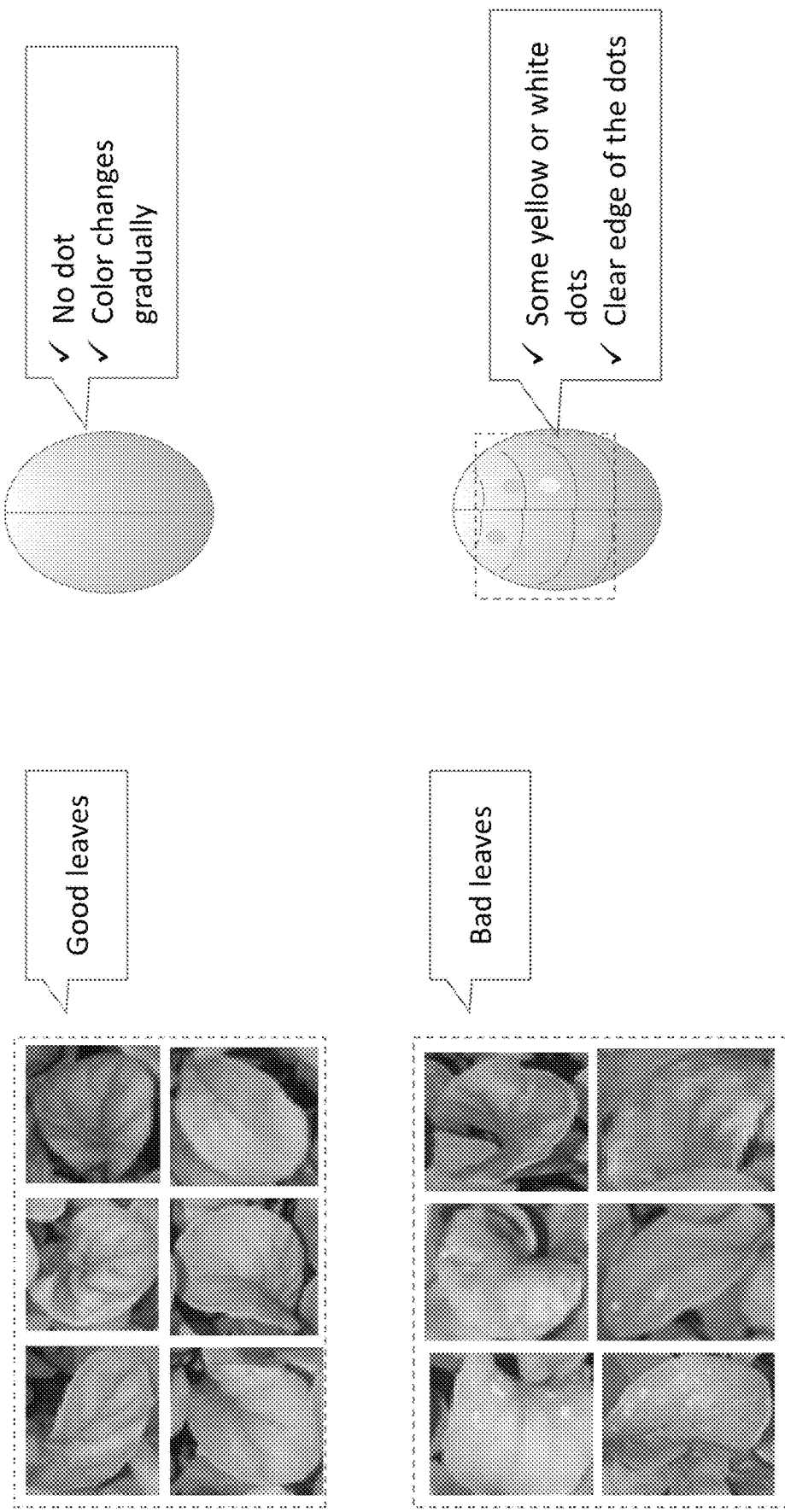
FIG. 10 illustrates the process for detecting defective plants in a grow environment.
Figure 11:
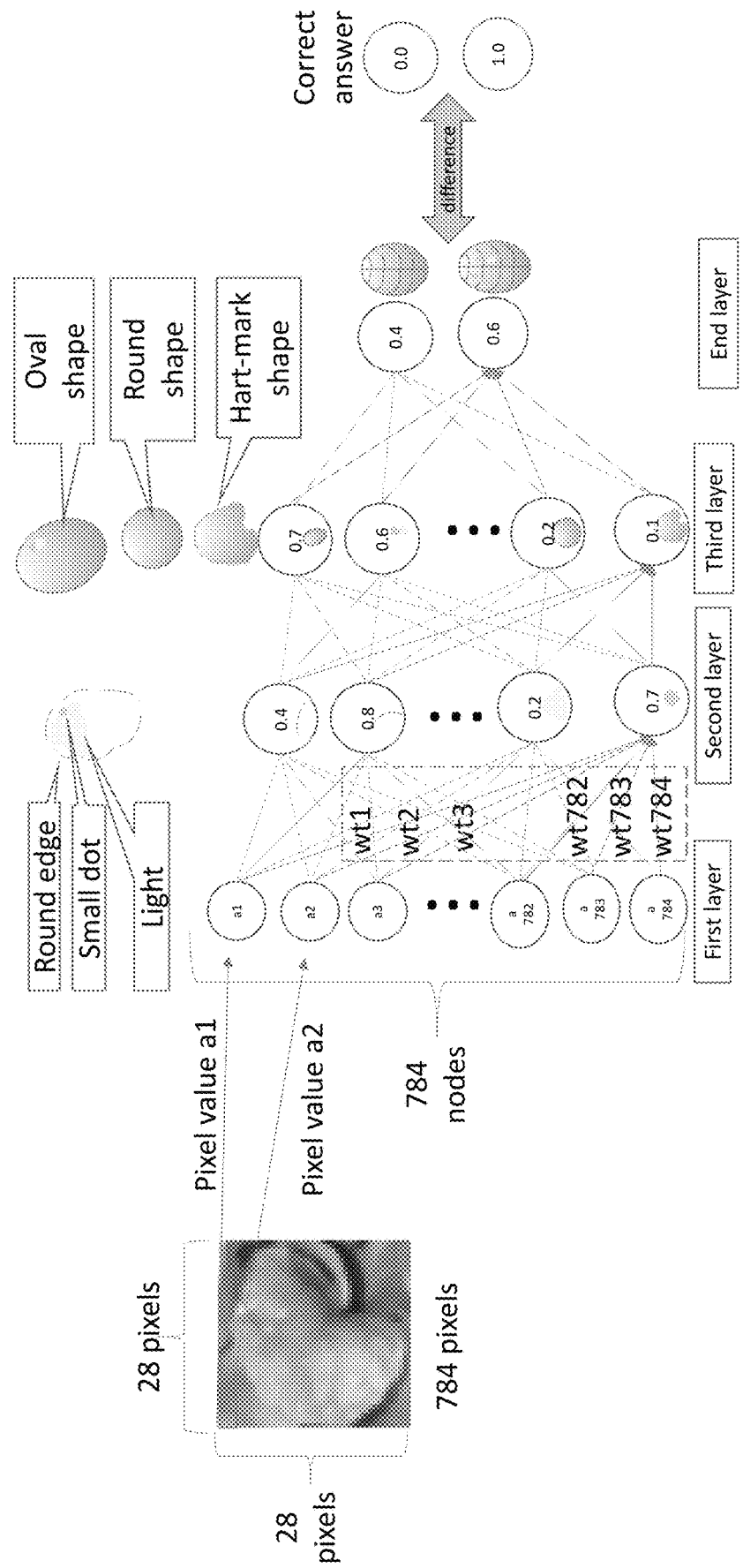
FIG. 11 illustrate the detection model used to detect defective plants in a grow environment.
Figure 12:
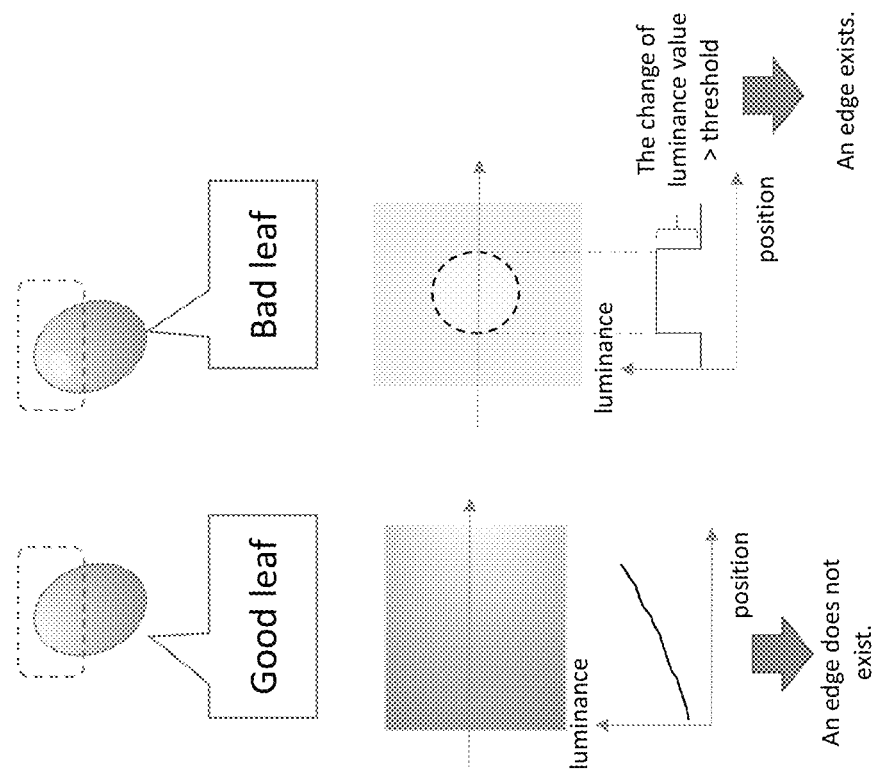
FIG. 12 illustrate the detection model used to detect defective plants in a grow environment.

FIGS. 10-12 depict and describe an exemplary plant defect detection algorithm which makes use of a trained machine learning model that has been trained to identify leaves that are defective. As will be described herein, the model is a neural network. However, any machine learning model may be implemented using the same described principles. This algorithm is executed by the server 11 to perform defect detection on the images captured of each tray in each stack and is used to generate the information regarding the number of trays containing defective plants that are supplied for purposes of generating the user interfaces and the operation thereof described above.

FIG. 10 illustrates leaves that are classified by the model described herein as good as compared to those that are classified as bad and thus will be considered defective. Each plant is distinguishable in that it is present within a predetermined sized pixel frame. In the embodiment shown herein, the predetermined pixel frame upon which defect detection is performed is a 28 pixel by 28 pixel frame. However, this is dependent on the type of plant being analyzed and its size. As such, the size of the frame depends on the plants leave being inspected. A detail of a detection of a defective leaf is explained and visualized in FIG. 11. In this embodiment, a 28 pixel*28 pixel captured image is analyzed. The captured image has 784 pixels. The captured image is converted into a gray scale image and each pixel has gray scale pixel value. The first layer in the neural network shows 784 nodes. Each nodes corresponds to respective pixels in the captured image. Pixel value of each pixels is input to respective nodes. Each node in the first layer is connected to a node in a second layer. A value of a node in the second layer is determined based on the values of all nodes in the first layer and weights for each nodes. The value of a node is determined based on the following equation:

$$w1*a1+w2*a2+w3*a3 \ldots w782*a782+w783*a783+w784*a784 \qquad (1)$$

From a1 to a784 are values of the nodes in the first layer and w1 to w784 are weights for the nodes in the first layer. At first, the weights (e.g. wt1-wt784) are set at random. The weights are recalculated based on a feedback from a user. For example, the recalculation of the weights are performed by using Mini-Batch Gradient Descent method. By recalculating the weights, the neural network is trained. The second layer has nodes less than the first nodes. Each nodes corresponds to a few pixels and each nodes corresponds to a shape which is part of the captured image. For example, one node corresponds to a part of an edge of a leaf and another node corresponds to round shape dot. The third layer has nodes less than the second nodes. A value of a node in the third layer is determined based on values of all nodes in the second layer and weights in the same way of determining the value of a node in the second layer. Each nodes in the third layer corresponds to a several pixels and each nodes corresponds to a shape which is part of the captured image. For example, one node corresponds to oval shaped leaf with round dots and other node corresponds to round shaped leaf without dot. In the same way, the value of the end layer is determined. The end layer has two nodes. One node corresponds to a leaf which is not defective and the other node corresponds to a defective leaf having one or more dots. The values of the nodes corresponds to a possibility of being good leaf or bad leaf. If a possibility of being bad leaf is more than a predetermined possibility, then the processor 111 determines that the leaf is a defective leaf. If the detection is not correct, the user can input correct information. The user input is translated into 1 or 0 by the server 11 and used to train the neural network. The difference between the input and the possibility that the neural network derived is used to tray the neural network. The model is trained so that the difference is reduced (e.g. Mini-Batch Gradient Descent method can be used).

In another embodiment, as illustrated in FIG. 12, determination by the model that there is a dot or spots on a leaf indicating that the leaf is defective can be performed by determining a change in luminance over a particular area (or position) within the image of the leave. As shown in FIG. 12, in a case where a dot is present on a leaf the luminance value changes to be a constant different luminance value which is higher over an area of the leaf. In the case that this detected luminance value is greater than a threshold for a predetermined area of the leaf, the model can determine that a spot is present and thus classifies the leaf as defective. This model can be used on its own as a defect detection model or can be combined into a node of the neural network of FIG. 11 to improve the spot detection performed therein.

If the shelf ID is read from the stack 301 and detection date and/or time is related to the shelf ID, the processor 111 reads captured image corresponding to the set of shelf ID and the detection date and/or time information. In step S529, the processor 111 generates plant view image of the shelf based on images read in step S528. Alternatively, the plant view image may be generated by terminal device 12. In step S530, the processor 111 specifies a number of trays containing one or more plants determined to have defects that are in the identified shelf based on the detection result of step S104. In step S531, the processor 111 subtracts the number of trays specified in step S530 from the current count number. The current count number is initially set to be the count number sent in step S109. The count number sent in step S109 indicates a number of trays containing plants with defects in all shelves and is displayed as the alert icon 102 on the home screen 100 of the terminal device 12 as shown in FIGS. 2B and 2C. The count number after subtraction indicates trays containing defective plants other than trays of which captured image is displayed on the plant view screen 103 or 106 shown. The count number after subtraction is displayed as alert icon 104 in the plant view screen 103 or alert icon 107 in the plant view screen 106.

In step S532, the processor 111 controls NW I/F 114 and sends images generated in S529 and the count number after the subtraction in S531 to the terminal device 12.

In step S533, the processor 111 updates the current count number to be the send count number (The count number after subtraction).

According to the steps S553 to S533, captured images of shelves are send from server 11 to terminal device 12 shelf by shelf, in an order of Last In First Out (LIFO) or First In First Out (FIFO) order. According to the LIFO order, the new images of shelf in which defective plant is lastly detected are send to the terminal device 12 prior to images of other shelf. According to the FIFO order, the oldest images of shelf in which defective plant is detected is send to the terminal device 12 prior to images of other shelf.

According to the steps S553 to S533, a number of trays which is displayed as alert icon 104 or 107 on plant view screen 103 or 107 is send from server 11 to the terminal device 12. The number of trays which is displayed as alert icon 104 or 107 is less than the number of trays which is displayed as alert icon 102. In this embodiment, a count number of trays are sent from the sever 11 to the terminal device 12, but the server 11 may send a count number of a shelf containing plant identified as defective instead of a count number of trays which contain defective plant.

Figure 6A:
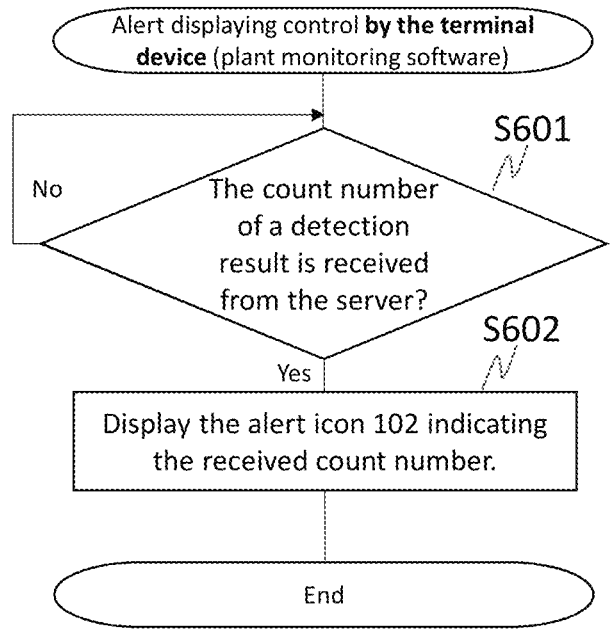
FIGS. 6A & 6B are a flow diagram and resulting user interface generated based on the flow diagram.
Figure 6B:
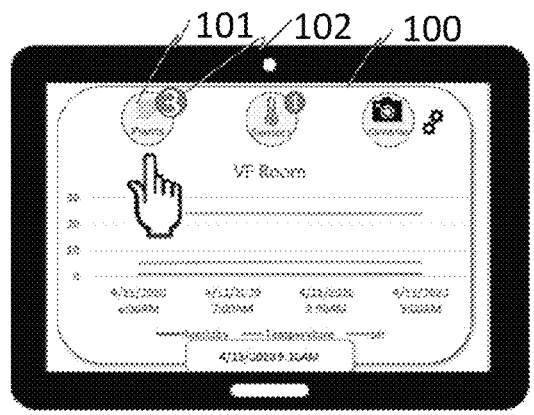
Figure 7A:
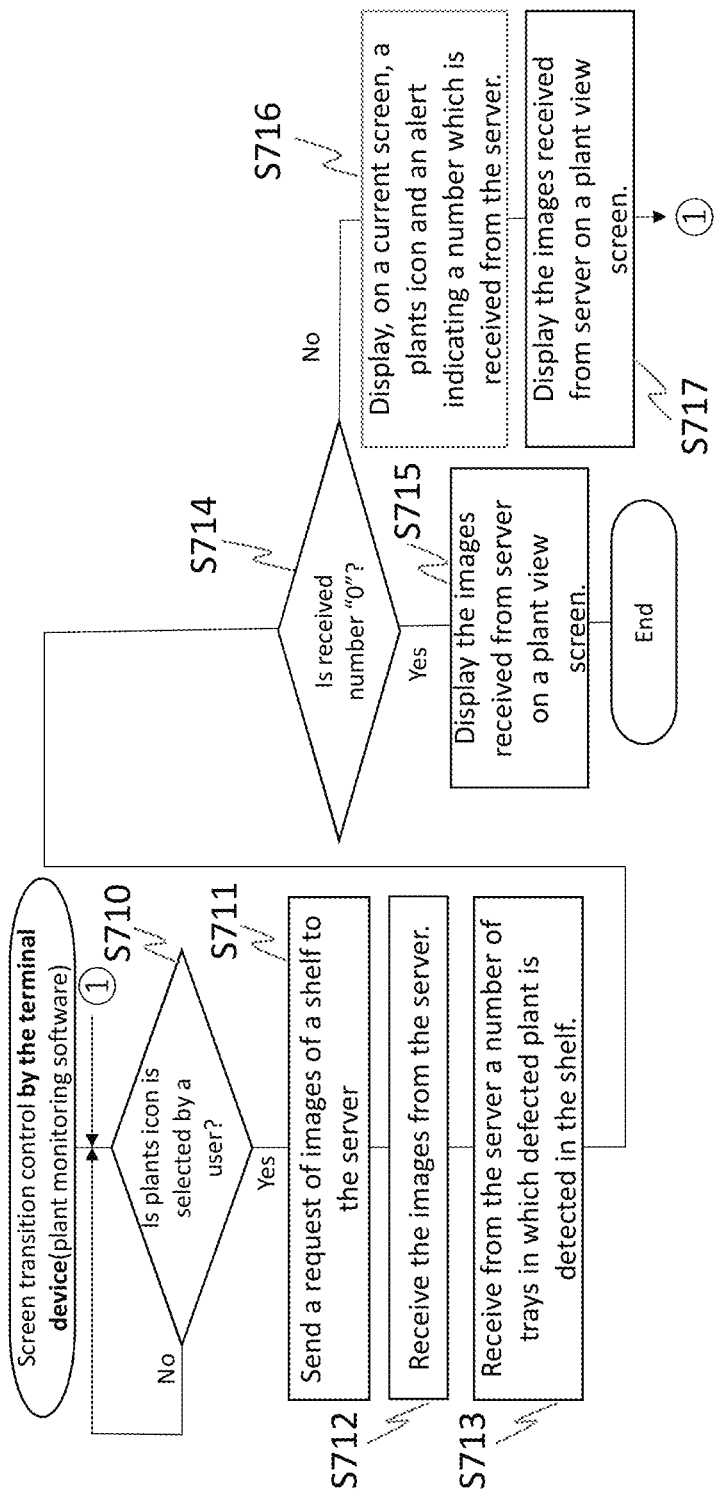
FIGS. 7A & 7B are a flow diagram and resulting user interface generated based on the flow diagram.
Figure 7B:
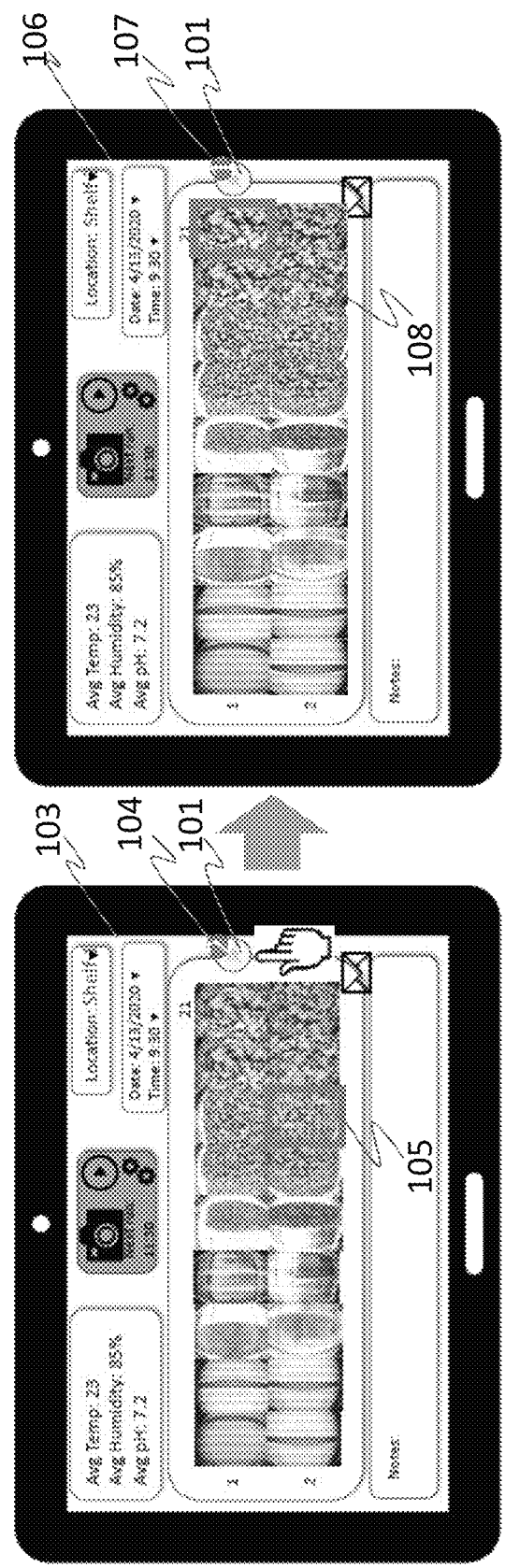

FIGS. 6A and 6B along with FIGS. 7A and 7B illustrate the generation and the transition flow of the user interfaces generated for display on the terminal device 12. An alert displaying control and screen transition control by the terminal device 12 is described below. The steps S601 and S602 and S710 to S717 are realized by the processor 121 by executing instructions (program) stored in the memory 122.

In step S601, the processor 121 determines whether the count number of trays is received from the server 11. This count number corresponds to the count number which is sent by the server 11 in step S109. The processor 121 repeats step S601 until the count number is received from the server 11. If the count number of trays is received from the server 11, the processor 121 proceeds to step S602. In step S602, the processor 121 controls the display 123 to display the alert icon 102 indicating the received count number. According to the step S601 and S602, a user can know a number of trays containing defective plants by checking the home screen 100. This processing is illustrated in the user interface illustrated in FIG. 6B Turning now to FIGS. 7A & 7B, step S710 to step S717 shows a screen transition control by the terminal device 12 based on selection of the alert icon. In step S710, the processor 121 determines whether the plant icon 101 is selected by a user. The processor 121 repeats step S710 until the plant icon 101 is selected. If the plant icon 101 on the home screen 100 is selected, the processor 121 proceeds to step S711. In step S711, the processor 121 control the NW I/F 124 to send a request of images of a shelf to the server. The images of a shelf includes images of trays on the shelf. In step S712, the processor 121 receives images of a shelf from the server 11. This images of a shelf corresponds to the images which are sent in step S532 from server 11. In step S713, the processor 121 receives, from the server 11, a number of trays in which defective plant is detected. This number indicates a number of trays in which defective plant(s) are detected in the shelf. This number corresponds to the count number which is sent from the sever 11 in step S532.

In step S714, the processor 121 determines whether the number received from the server 11 is "0" which means that there are no longer any trays containing defective plants. If the received number is "0", processor 121 displays, in step S715, the images received from server 11 on a plant view screen 103 or 104. If the received number is not "0", the processor 121 proceeds to step S716. In step S716, the processor 121 controls the display 123 to display, on a current screen, a plants icon 101 and an alert 104 or 107 indicating a number which is received from the server 11. This number is the number which is sent from the server 11 in step S532. In step S717, the processor 121 controls the display 123 to display the images received from server 11 on the plant view screen 103 or 104. Then the processor 102 returns to step S710. In this way, as shown in FIG. 7B, on a first screen, the processor 121 displays a first number (alert icon 102) of one or more fields where one or more defective plants are detected or of one or more defective plants and changes a displayed screen from the first screen (home screen 100) to a second screen (plant view screen 103), in a case where an instruction to change a screen is received (the plants icon 101 is tapped), wherein one or more pictures of plants in a first field is displayed on the second screen. The processor 121 displays, on a second screen (plant view screen 103), a second number (alert icon 104) of a field where one or more defective plants are detected or of one or more defective plants, wherein the second number is less than the first number and displays, on the second screen, an user interface (the plants icon 101) to instruct to change a displayed screen from the second screen (the plant view screen 103) to a third screen (the plant view screen 106), wherein one or more pictures of plants in a second field is displayed on the second screen.

Figure 8:
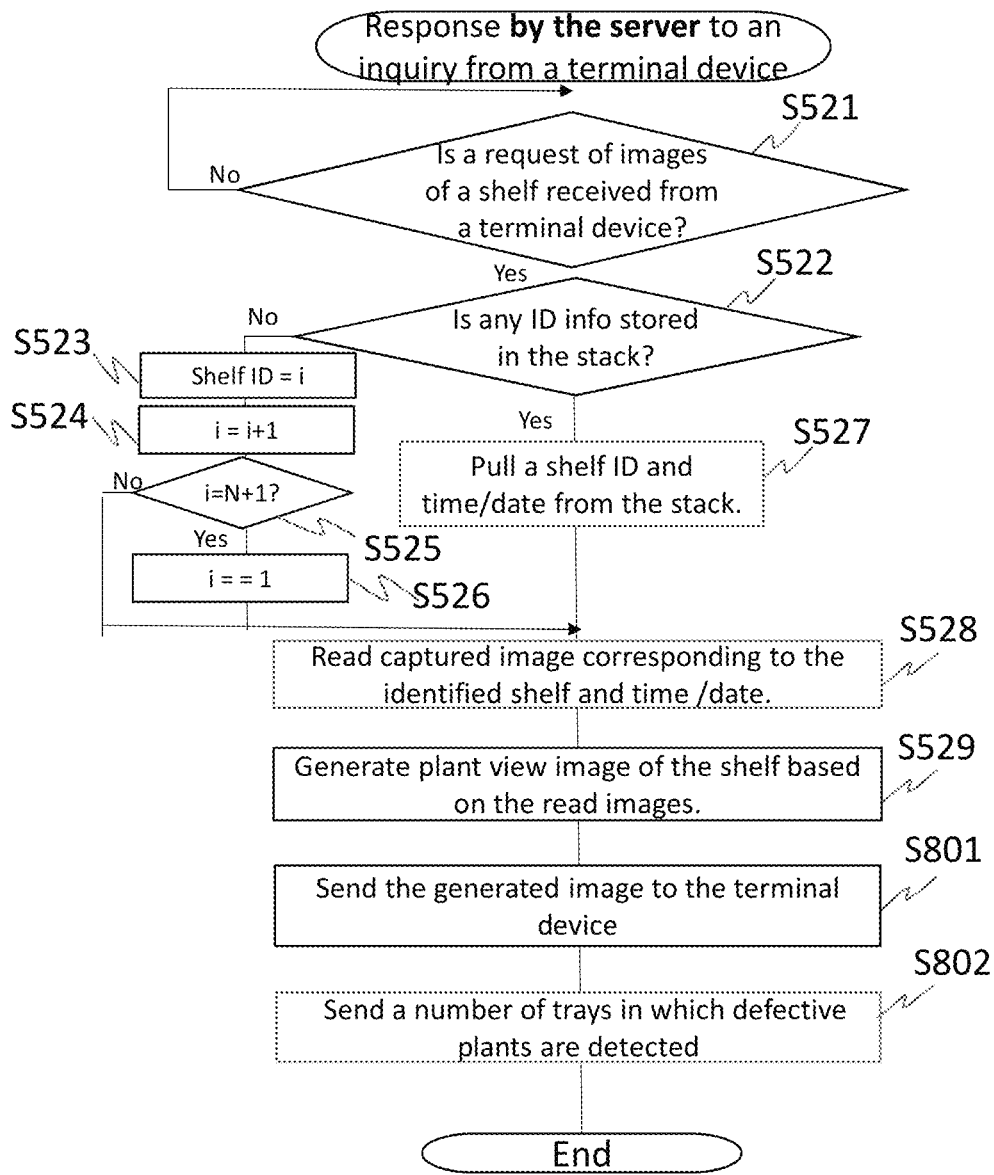
FIG. 8 is a flow diagram of an exemplary detection and display algorithm.

FIG. 8 illustrates a flow diagram of an alternate embodiment of the flow diagram of FIG. 5B. For purposes of simplicity, on the steps different from those described above with respect to FIG. 5B will be described. In the first embodiment described in FIG. 5B, the server 11 decreases a count number of trays that are determined to contain defective plants. In this embodiment, the terminal device 12 decreases the count number of tray in a case where the displayed screen is changed. As such, steps S501 to S509 and steps S521 to S529 are the same as described above with respect to FIG. 5B and are hereby incorporated by reference. In step S801, the processor 121 sends images generated in step S529. In Step S802, the processor 121 sends number of trays in which defective plant is detected.

Figure 9A:
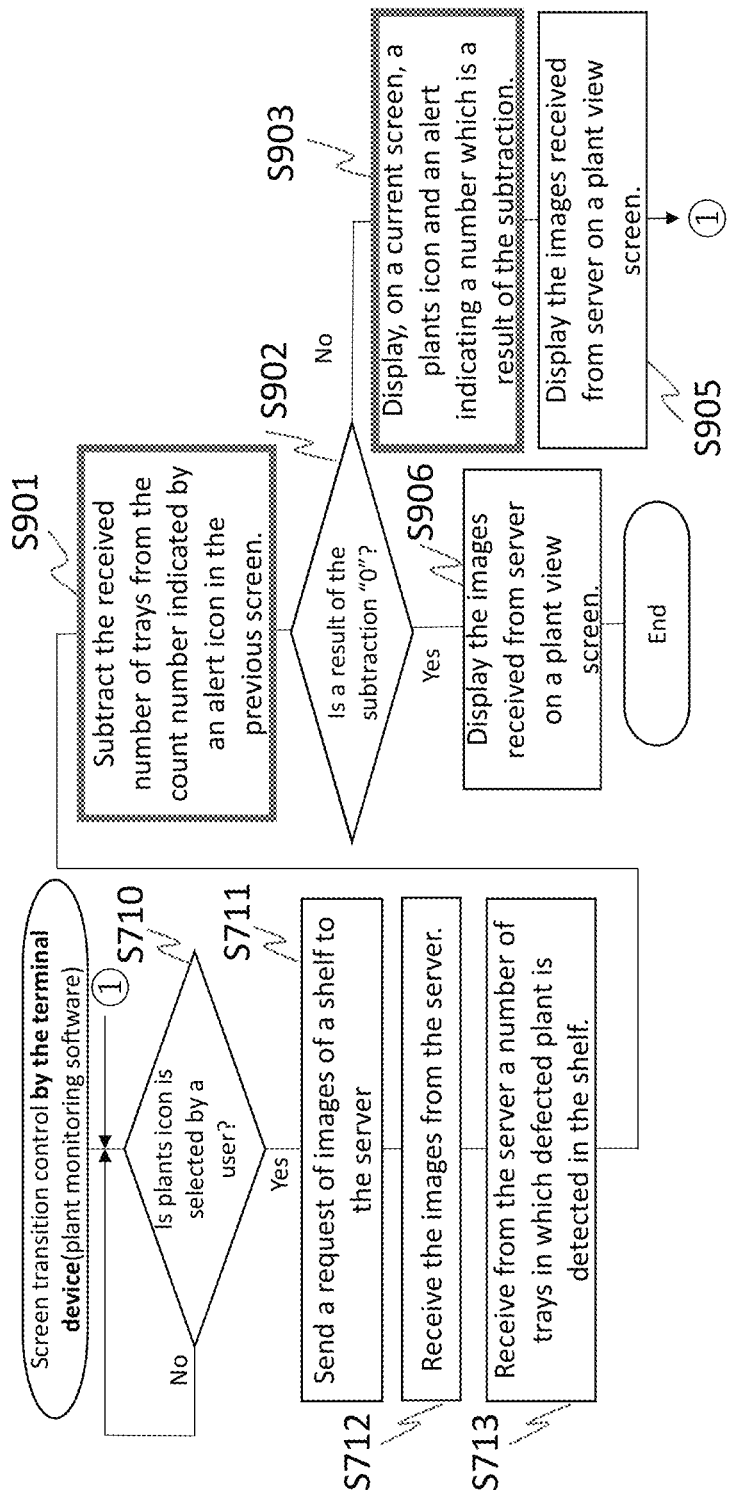
FIGS. 9A & 9B are a flow diagram and resulting user interface generated based on the flow diagram.
Figure 9B:
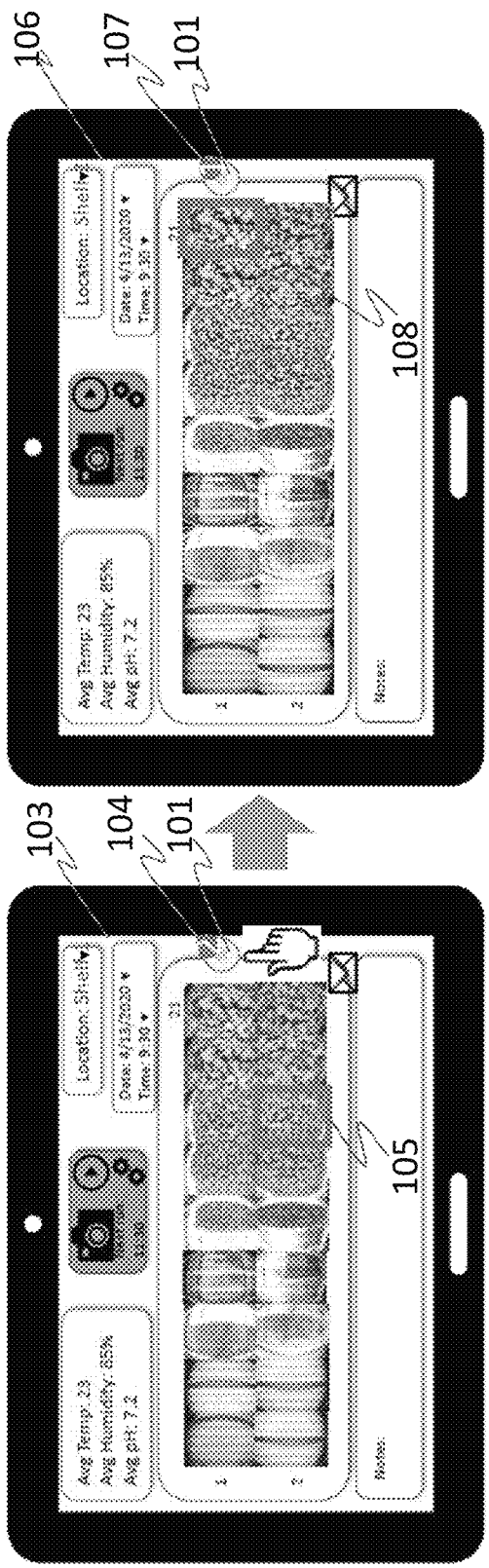

Exemplary operation of the embodiment discussed with respect to FIG. 8 can be understood via the flow diagram of FIG. 9A along with the depiction thereof in the user interface of FIG. 9B. Firstly, it should be noted that the main screen as shown in FIGS. 6A & 6B are the same and need not be further described. The difference between the present embodiment and the one discussed relates to the logic in generating the user interface and this is represented in FIGS. 9A & 9B.

In FIG. 9A, the initial steps S710-S713 are the same as those described above with respect to FIGS. 7A and 7B and need not be repeated. Those descriptions are incorporated herein by reference. After step S713, the flow diagram proceeds to step S901.

In the step S901, the processor 121 subtracts the received number of trays from the count number indicated by an alert icon in the previous screen. For example, this count number is the alert icon 102 "3" and the receive number of trays is "1". The processor 121 subtracts "1" from "3" and then the processor 121 derives a result of subtraction "2".

In step S902, the processor 121 determines whether the number received from the server 11 is "0" which means that there are no longer any trays containing defective plants. If the received number is "0", processor 121 displays, in step S906, the images received from server 11 on a plant view screen 103 or 104. If the received number is not "0", the processor 121 proceeds to step S903. In the step S903, the processor 121 controls the display 123 to display the plant icon 101 and an alert 104 or 107 indicating a number which is a result of the subtraction from S901. For example, the result of the subtraction "2" is displayed as an alert icon 104 in the plant view screen 103. Then, in step S905, the processor 121 controls the display 123 to display, on a current screen, a plants icon 101 and an alert 104 or 107 indicating a number which the result of step S901. Then the process returns to step S710.

In addition to the depiction and easy transition between user interfaces described above, the user interfaces themselves allow for display of additional types of information as well as the initiation of various control functionality therein. These additional features will now be described with respect to FIGS. 13-27. Therein, different user interfaces configured to be displayed by the algorithm executing on the terminal device will be described.

Figure 13:
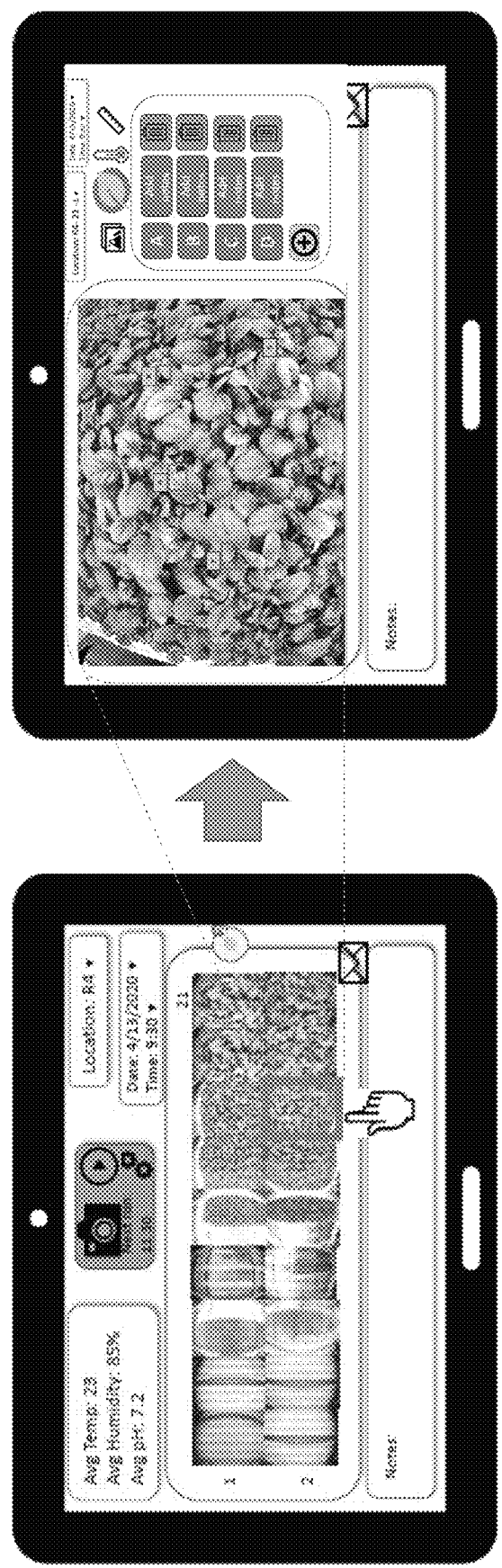

In FIG. 13, the user interface showing the frame which identifies a particular tray having one or more defective leaf can be expanded such that, in response to selection thereof, an enlarged, detailed view of the particular tray is caused to be displayed on the display of the terminal device 12. As shown in FIG. 13, the tray illustrates four individual leaves that are themselves framed indicating that the detection algorithm of FIGS. 10-12 determined them to be defective. Further presented in the enlarged tray view user interface are one or more fields associated with the one or more frames shown therein. This allows for receipt of input by a user of information about the leaf within a particular frame. Further provided is a deletion icon which receives an input from a user that indicates that the frame around a particular leaf is incorrectly placed. Further provided is a defect identification icon that, upon selection thereof, allows a user to manually add a frame around a leaf in the tray in a case where the detection algorithm misidentifies a leaf as "good". In this instance, the addition of a frame defining a non-detected leaf as defective is provided as feedback to the server 11 and is used by the server as additional training data to further train the defect detection model described above.

FIG. 14. Illustrates a user interface displayed on the terminal device when a sensors icon as shown in FIG. 2A is selected. In this instance, the application executing on the terminal device generates a user interface representing a graph of one or more environmental conditions in the vertical farming environment. The sensors icon can be populated with alert indications in a manner similar to the plant icon described above such that continual selection thereof enables subsequent display of environmental conditions in a place where a defective leave (or other anomaly) has been detected. In one embodiment, as shown in FIG. 14, the temperature has gone below a threshold temperature value and triggers an alert for the user. In this manner, the sensor alert indicator can be populated allowing the user to view environmental data over a particular period and zoom in to get more resolution associated with the environmental conditions depicted in the graph of FIG. 14.

Figure 15:
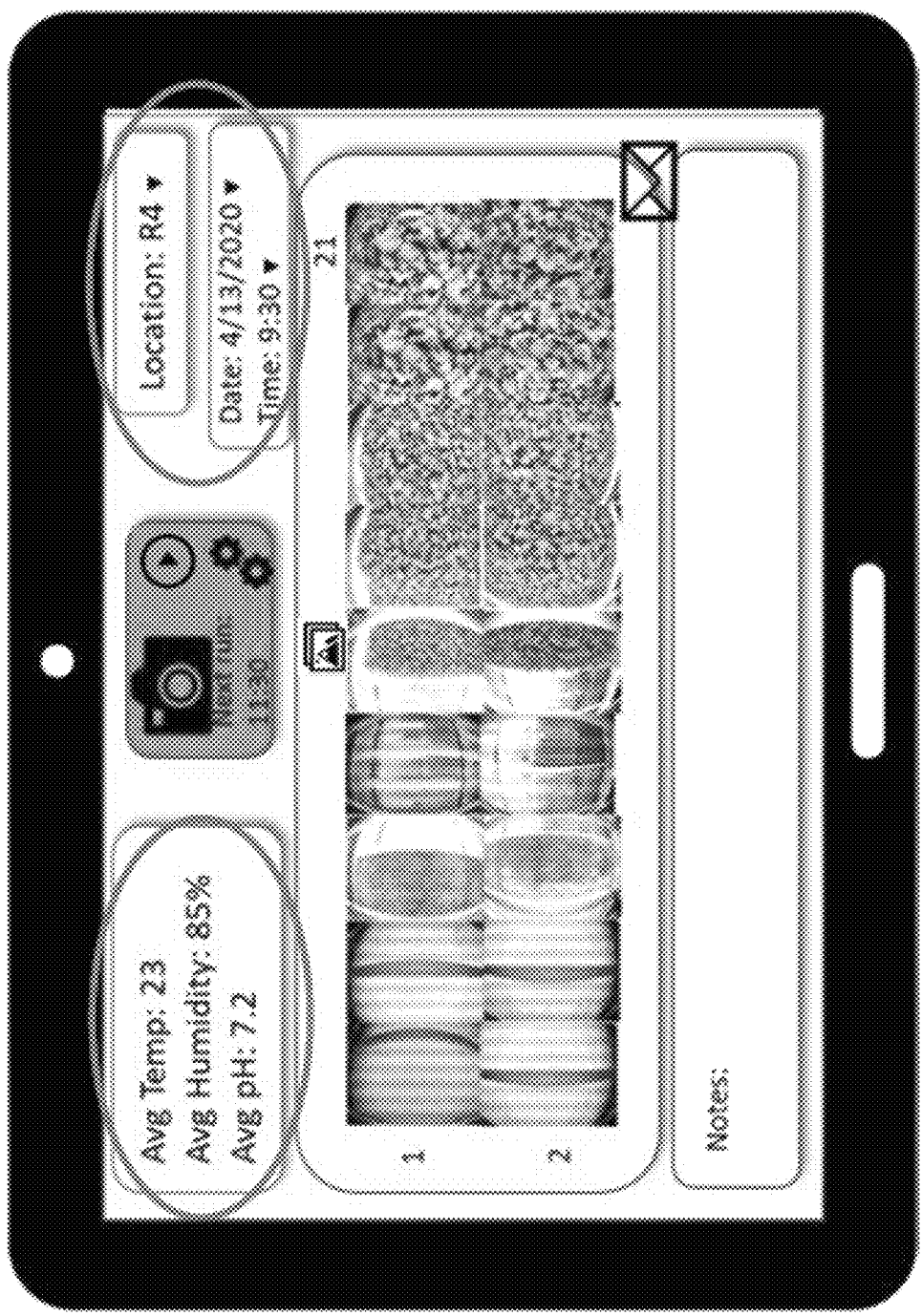

FIG. 15 depicts the user interfaces 103 and 106 shown and discussed in FIGS. 2B and 2C. From within this user interface, there are additional selectable image elements that provide further information about one of the particular tray depicted within the presently displayed user interface and/or the entire vertical farming environment. The areas of the user interface shown within the circles illustrate the types of additional information that can be displayed and further inspected in response to selection thereof. This information is derived from sensor readings taken at the same time that image of the leaves were taken. This advantageously enables the user to view an entire grow area from within the user interface on the terminal device.

Figure 16:
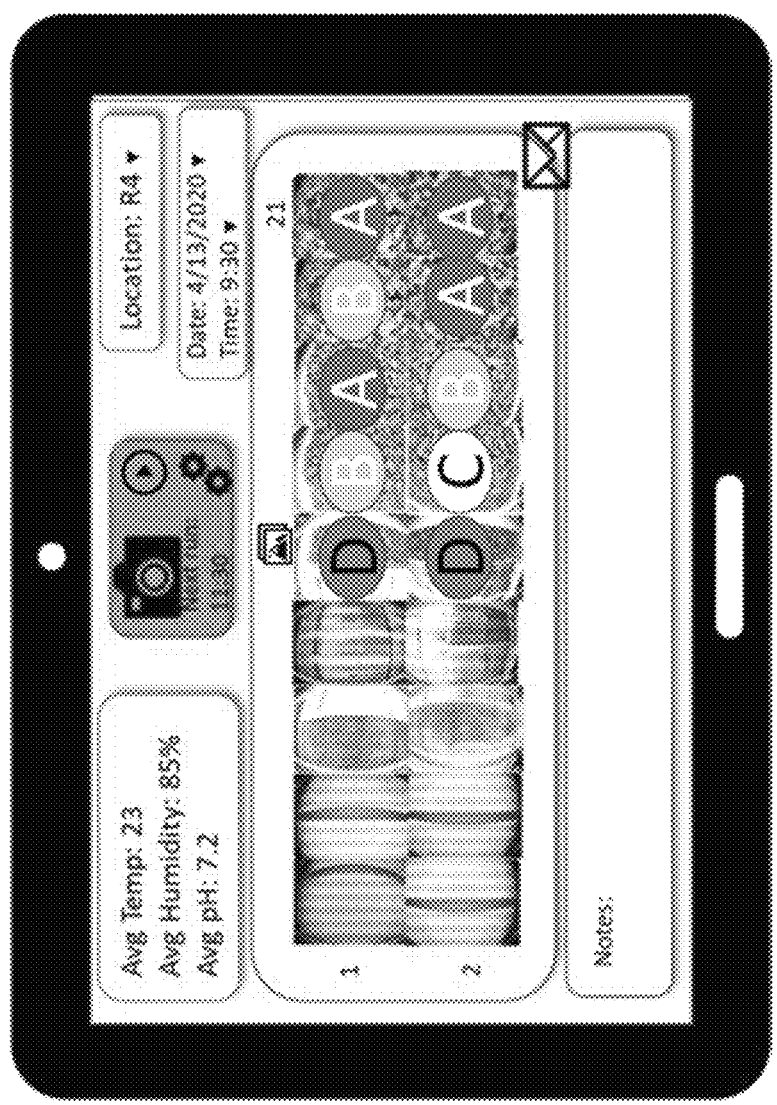

FIG. 16 illustrates another embodiment where the application executing on the terminal devices causes a grade indicator to be displayed over each tray. In one embodiment, the system automatically determines the quality of each try by identifying elements that indicate plant health to allow for users to determine if a particular tray is suitable for harvest or if it needs to be treated to improve the displayed grade.

Figure 17:
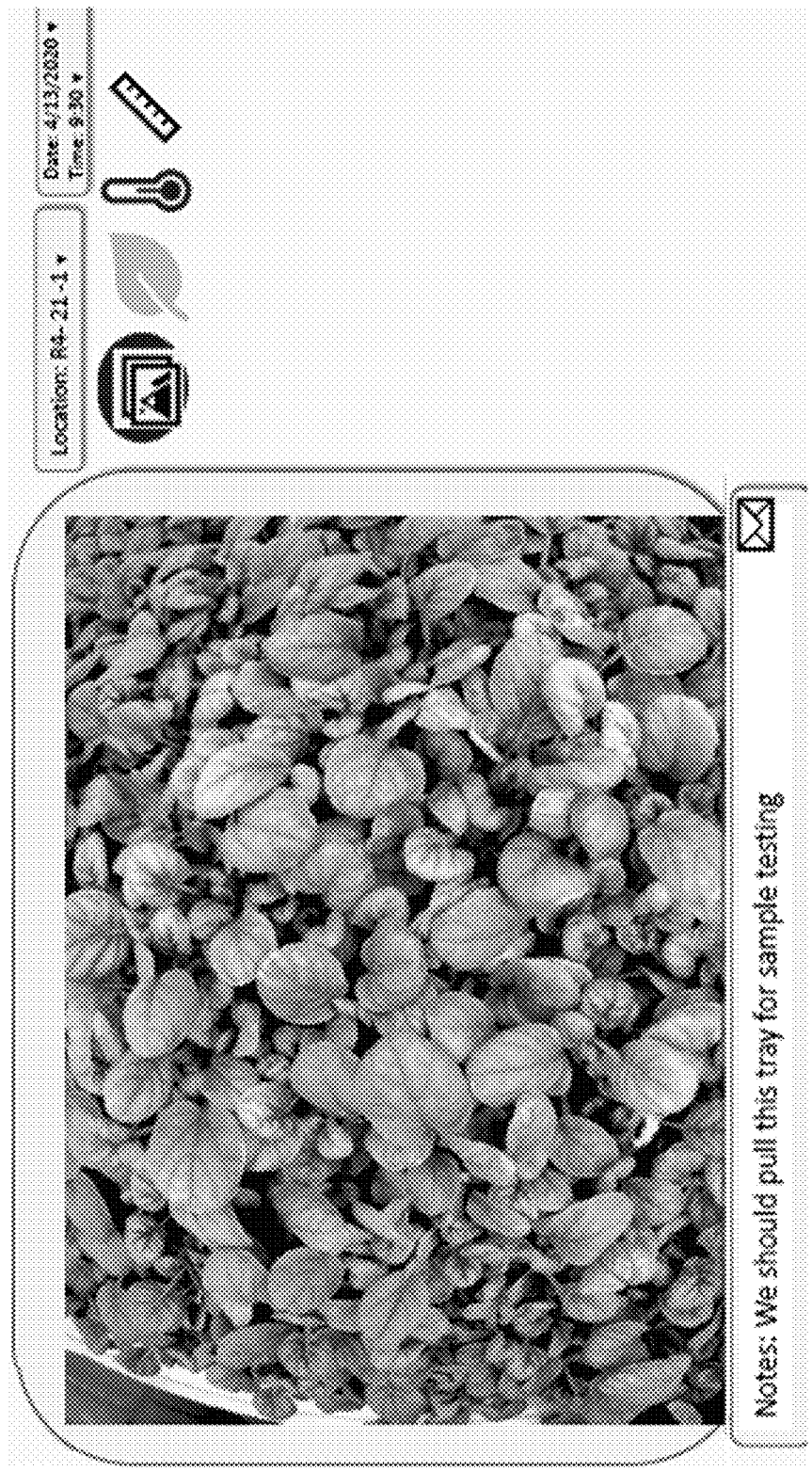
Figure 18:
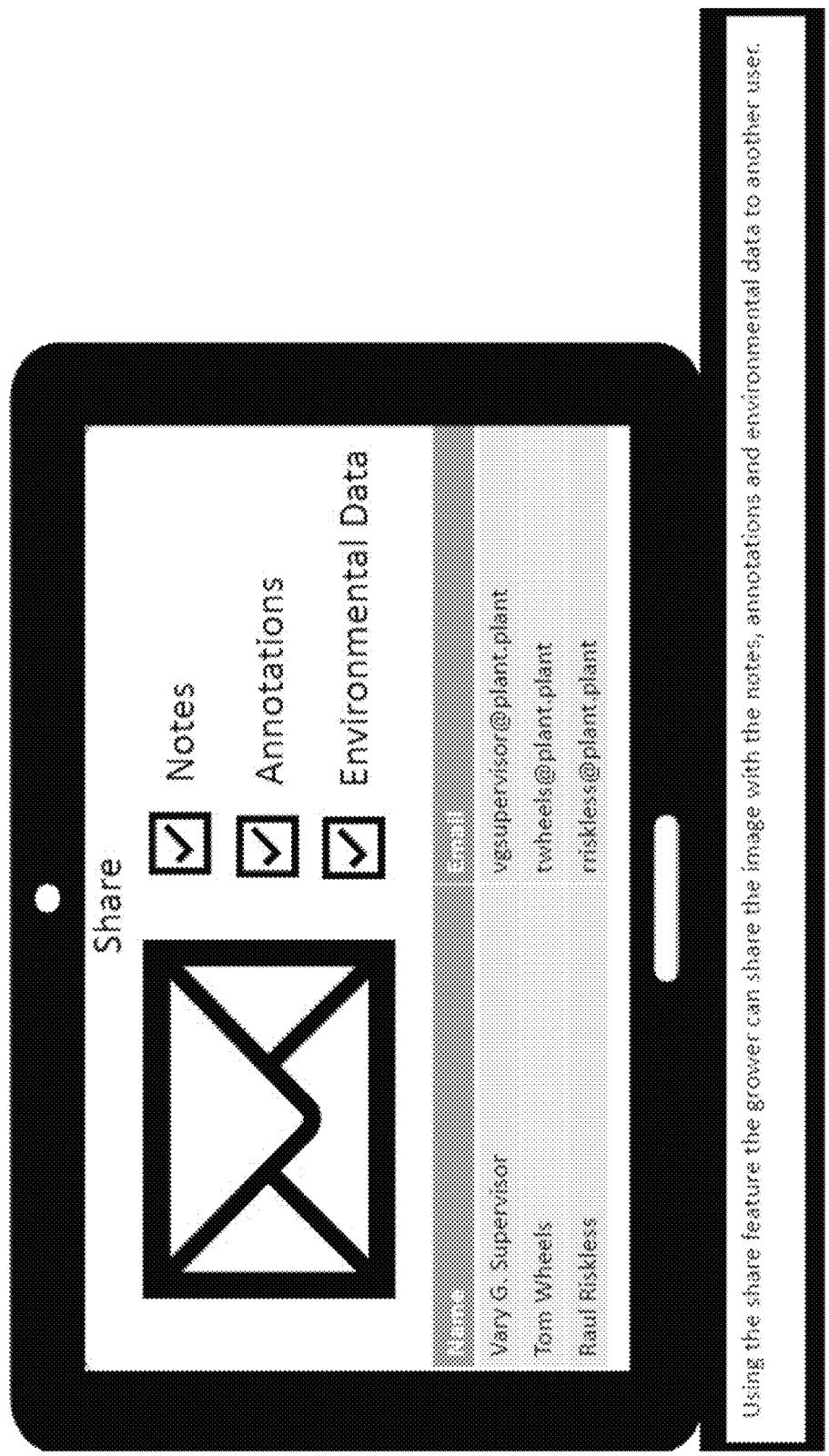

FIGS. 17-22 illustrate user interfaces that are caused to be displayed after a user has selected a particular grow tray to be displayed in an enlarged manner providing higher resolution that allows the user to better visualize the particular grow tray. In FIG. 17, the enlarged view of the plant tray illustrates a notes field that receives user input adding further information about the tray being displayed. Further included therein is a selectable image element that causes the image being displayed and the data input via the input field to be communicated, for example by email, to one or more other individuals. Selection of the envelope icon causes the user interface in FIG. 18 to be displayed. From within the user interface in FIG. 18, the user communicating the information can define the recipients thereof as well as what type of information is to be included in the communication.

Figure 19:
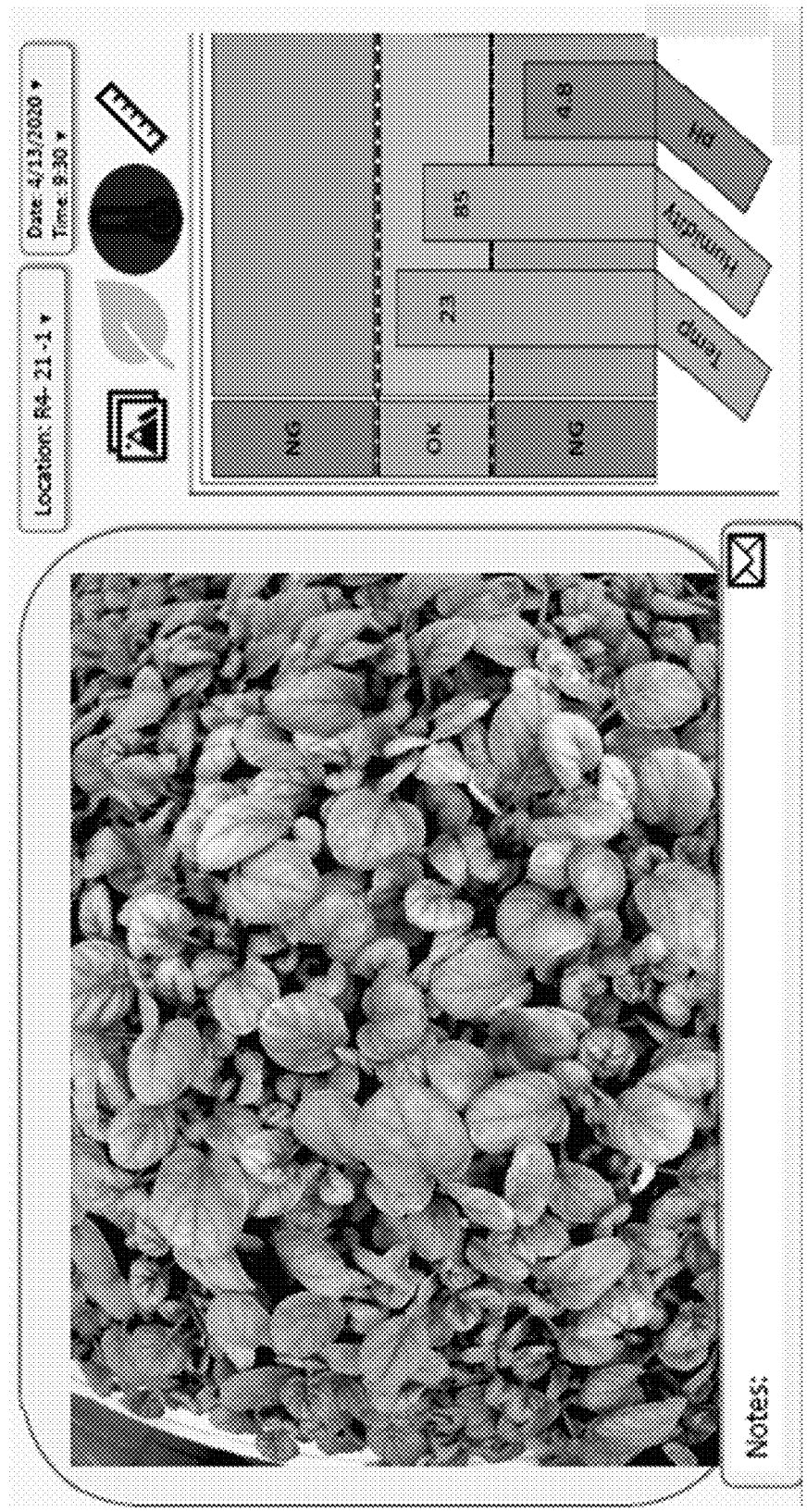
Figure 20:
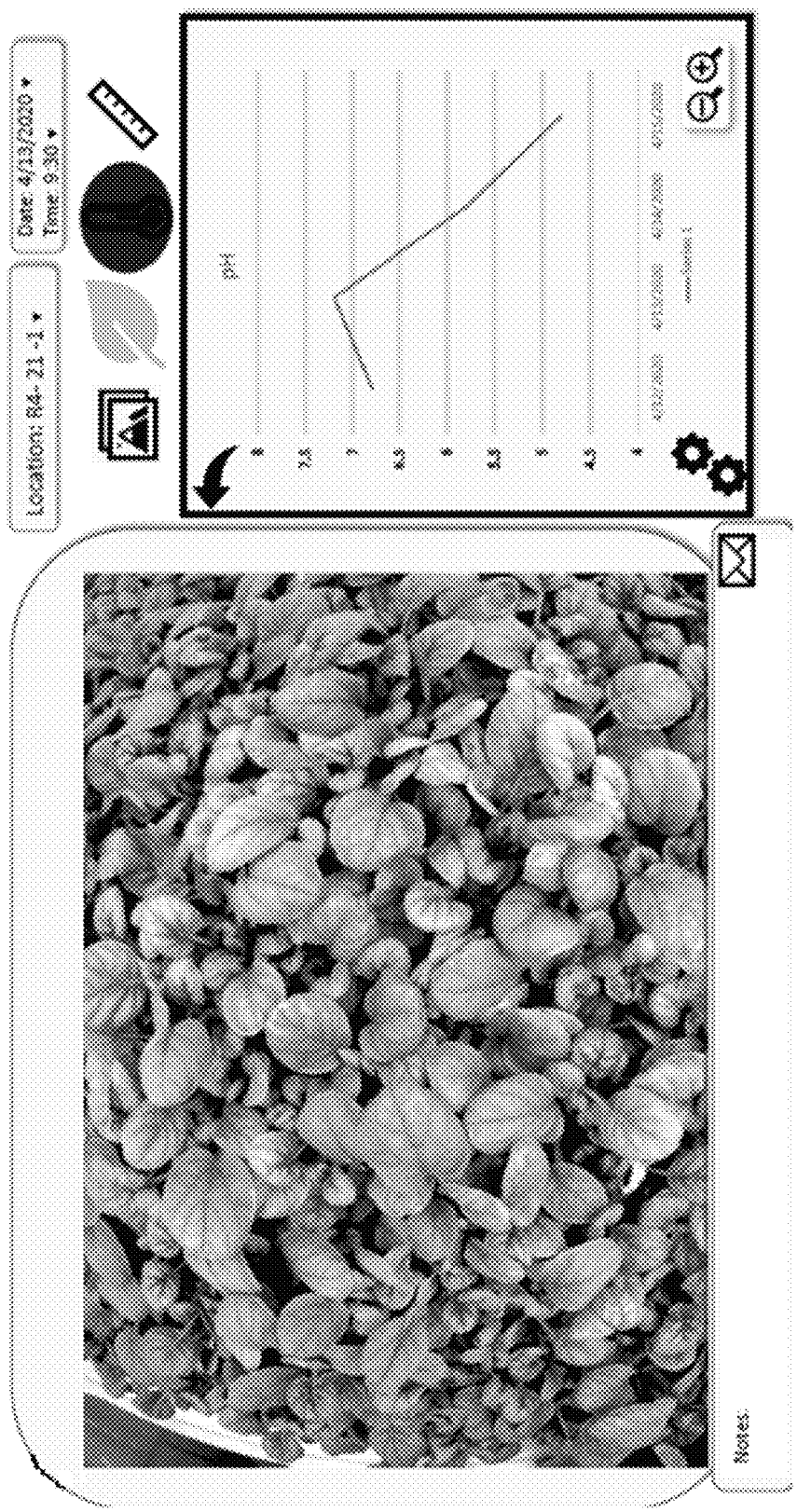
Figure 21:
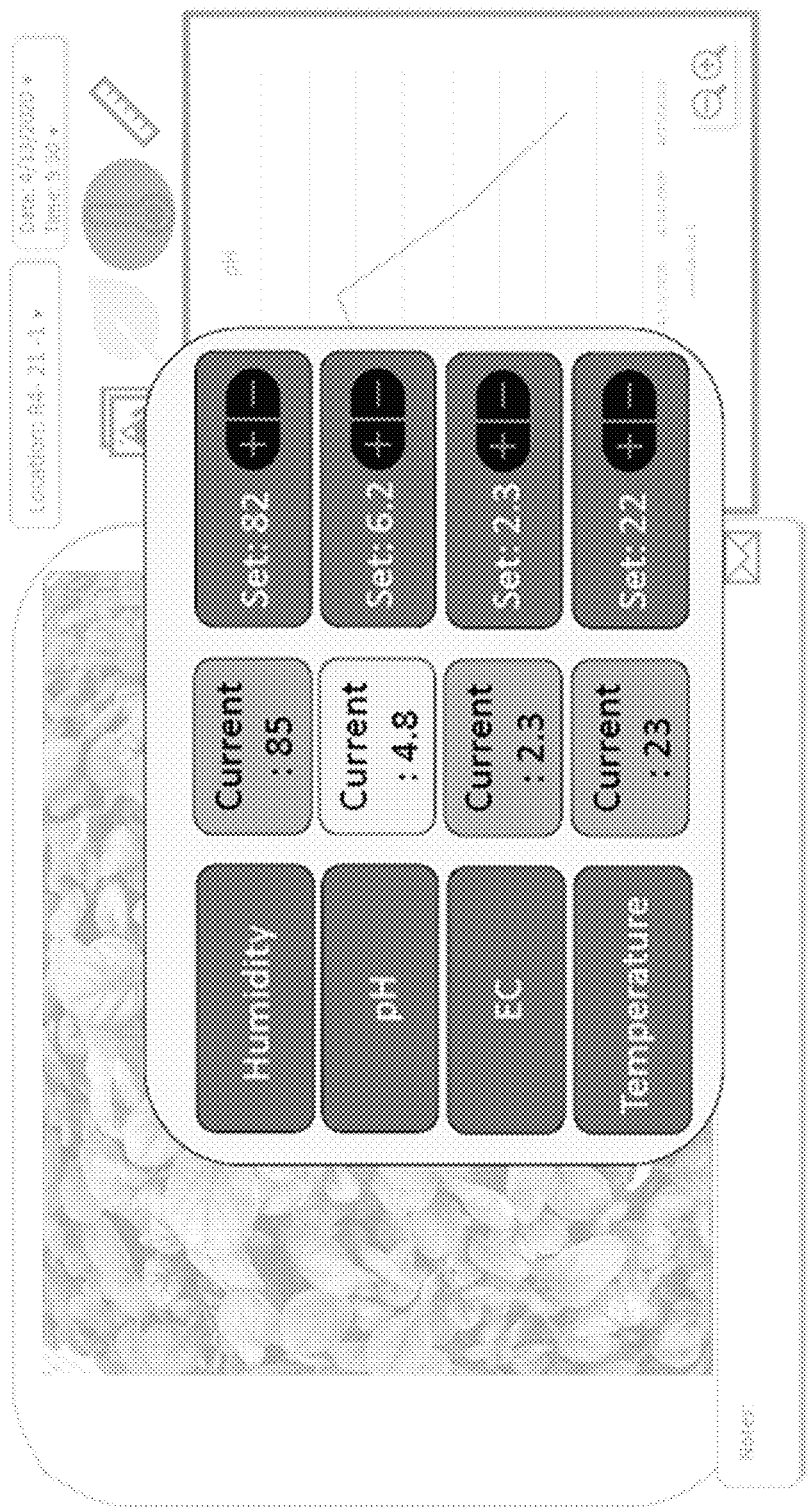
Figure 22:
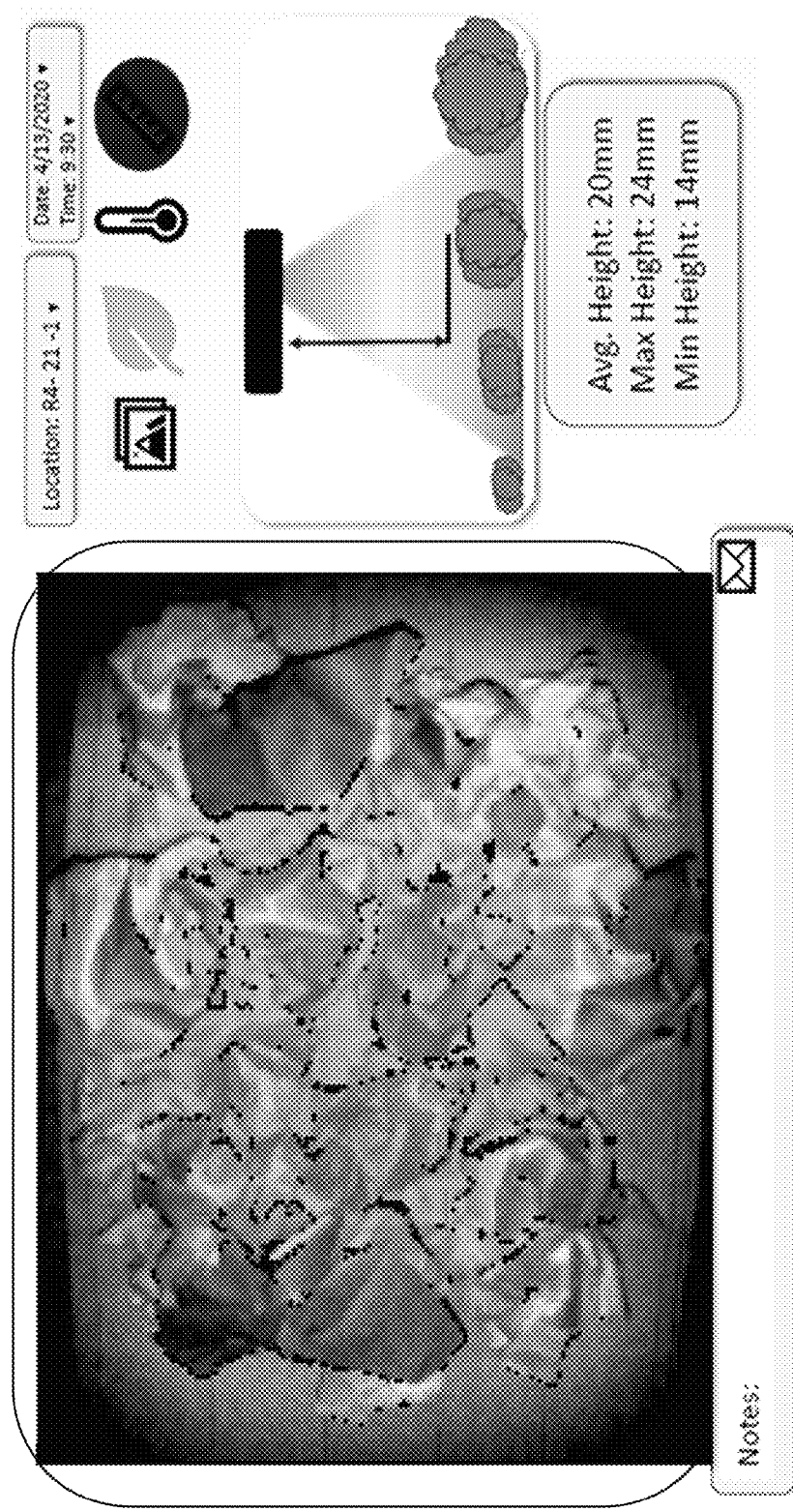

In FIG. 19, selection of a sensor icon from within the enlarged plant view user interface causes display, adjacent to the image of the grow tray, of information derived from sensors within the vertical farm environment that are positioned closest to the particular grow tray show within the user interface. This may, for example, show whether the conditions at the time of image capture were within a normal range as indicated by the green portion of the bar graph of FIG. 19. In this embodiment, three environmental conditions are illustrated. However, any environmental condition sensed by a sensor at the vertical farm environment can be included in this graph. FIG. 20 illustrates an enhanced view of one of the characteristics shown in FIG. 19. In this example, selection of the pH bar causes a more detailed view of the pH over a period of time and provides higher resolution data such that a user can zoom in and out in order to view trend information of the selected environmental characteristic. In FIG. 21, a user interface is caused to be displayed that allows for definition and control of various environmental characteristics at the vertical farming facility. This user interface can, in one embodiment, control the characteristics of all conditions at the entire facility. Alternatively, in another embodiment, this user interface allows for a user to set and define optimum environmental characteristic values for a particular stack and/or tray within a stack. FIG. 22 depicts a user interface generated in response to selection of the measurement icon illustrated as a ruler. Selection of the measurement icon causes plant height data to be recorded and displayed at each location and allows the user to view the max, min and average height of plants within the frame. This measurement is performed using an infrared camera capture to distinguish heights and causes the enlarged image of the grow tray to be modified to show a topology map of the plants indicating the measured height.

Figure 24:
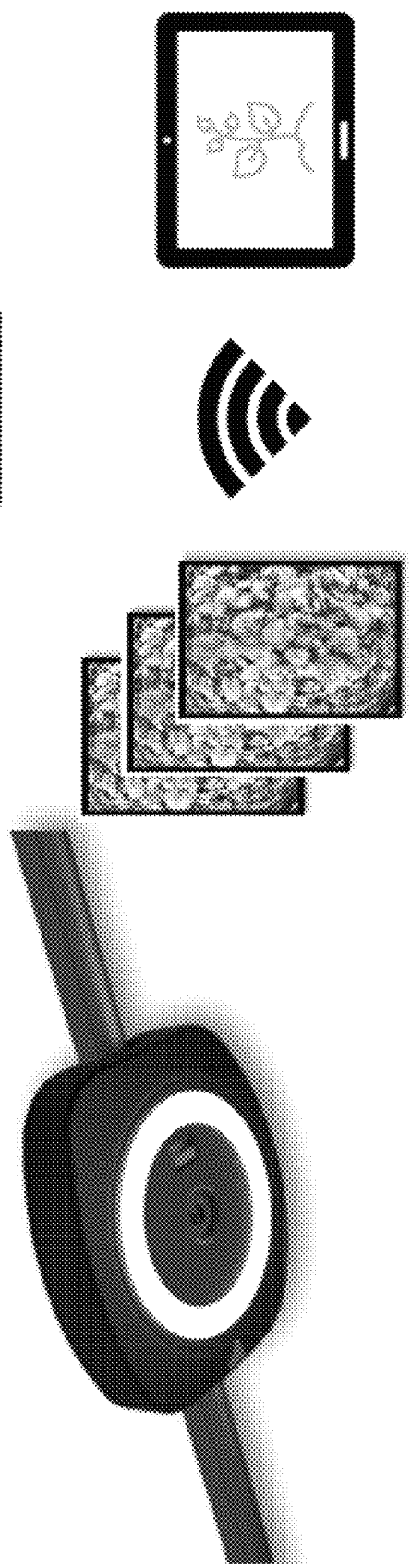
Figure 27:
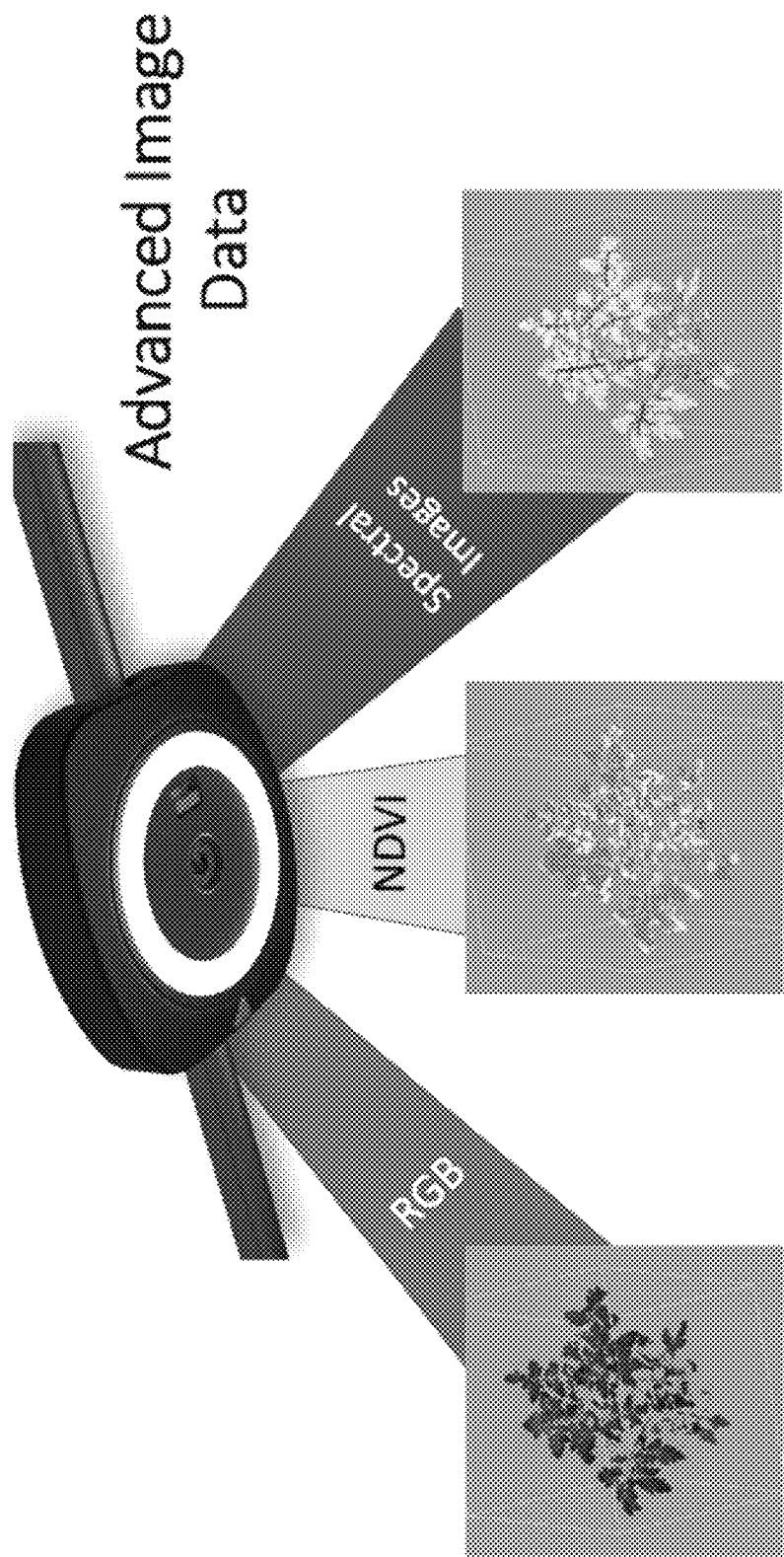

FIGS. 23-27 illustrate various user interfaces that are displayed in response to selection of the camera icon shown in FIG. 16. In FIG. 23, the application executing on the terminal device 12 causes a color of the camera icon in FIG. 16 to be changed based on status information of the particular camera positioned above the particular grow tray being displayed at a current time. As shown in in FIG. 23, four operational states of the camera are indicated on the physical camera and these can be conveyed to the user by the change in color of the camera icon. From within the camera icon, an action icon is visible and selectable. AS shown in FIG. 24, selection of the action icon causes a capture signal to be generated and transmitted via network to the server which instructs the particular camera identified in the capture signal to perform a data collection cycle comprised of capturing one or more images of the grow tray above which the camera is positioned. The camera icon further includes a user selectable settings icon which allows for the user to set and define image capture schedules and instructions as shown in FIG. 25. From within the settings mode of FIG. 25, a user can selectively preview an image capture area and define, from that preview, an area of the grow tray to be captured either at a current time or as part of future image capture cycles as shown in FIG. 26. Further, the settings mode from FIG. 25 may allow the user to define an image capture type in order to capture images using different spectral ranges such as RGB capture, NDVI capture and spectral image capture as shown in FIG. 27. The visualization from these different image capture modes further enables identification of defects or other issues that are not visible during traditional image capture modes.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments.

We claim:

1. A server comprising:
  at least one memory storing instructions; and
  at least one processor that, upon execution of the instructions, configures the server to
    receive, from a first camera, one or more captured images captured by the first camera, wherein the first camera captures images of plants included in one or more trays in a first field;
    receive, from a second camera, one or more captured images captured by the second camera, wherein the second camera captures images of plants included in one or more trays in a second field;
    perform detection processing to detect a defective plant based on the images received from the first camera and the second camera;
    store, in memory, a number of trays containing one or more defective plants in a case where a new tray containing a defective plant is detected;
    notify the increased number of the trays containing one or more defective plants to a terminal device,
    store, in a stack or a queue, identification information corresponding to a field where the defective plant is detected;
    receive, from the terminal device, a request for captured images of a field where defective plant is detected;
    read, from the stack or the queue, one of the identification information corresponding to a field in a case where the request is received;
    decrease the number of the trays containing one or more defective plants in response to the reading of the identification information from the stack or the queue; and transmit, to the terminal device, one or more captured image of plants in a field corresponding to the read identification information and the decreased number of the tray containing defective plant.

2. The server according to claim 1 wherein the first field is a first shelf where a plurality of trays of plants are cultivated and the second field is a second shelf where a plurality of trays of plants are cultivated.

3. The server according to claim 2 wherein the first camera is installed on a celling of the first shelf and the second camera is installed on a celling of the second shelf.

4. The server according to claim 2 wherein the captured image of a shelf where defective plant is detected is transmitted to the terminal device in an order of Last In First Out (LIFO) order or First In First Out (FIFO) order.

5. The server according to claim 1 further configured to transmit, to the terminal device, in a case where the identification information is not stored in the stack or queue, one or more captured image of plants in a field corresponding to a parameter which varies from 1 to N, wherein N corresponds to a number of shelfs from which the server receives pictures of plants.

6. A system comprising a server and a terminal device, the system configured
to
  receive, by the server, from a first camera, one or more captured images captured by the first camera, wherein the first camera captures images of plants contained by one or more trays in a first field;
  receive, by the server, from a second camera, one or more captured images captured by the second camera, wherein the second camera captures images of plants contained by one or more trays in a second field;
  detect a defective plant based on the images received from the first camera and the second camera;
  a number of trays containing one or more defective plants in a case where a new tray containing a defective plant is detected;
  transmit, by the server, the increased number of the tray containing one or more defective plants to a terminal device,
  store, in a stack or a queue, the identification information corresponding to a field where the defective plant is detected;
  receive, by the server, from the terminal device, a request for captured images of a field where defective plant is detected;
  read, by the server, from the stack or the queue, one of the identification information corresponding to a field in a case where the request is received;
  decrease, by the server, the number of the trays containing one or more defective plant in response to the reading of the identification information from the stack or the queue;
  display, on the terminal device, one or more captured image of plants in a field corresponding to the read identification information and the decreased number of the tray containing defective plant.

7. A method performed by a server comprising:

receiving, from a first camera, one or more captured images captured by the first camera, wherein the first camera captures images of plants included in one or more trays in a first field;

receiving, from a second camera, one or more captured images captured by the second camera, wherein the second camera captures images of plants included in one or more trays in a second field;

performing detection processing to detect a defective plant based on the images received from the first camera and the second camera;

storing, in memory, a number of trays containing one or more defective plants in a case where a new tray containing a defective plant is detected;

notifying the increased number of the trays containing one or more defective plants to a terminal device, storing, in a stack or a queue, identification information corresponding to a field where the defective plant is detected;

receiving, from the terminal device, a request for captured images of a field where defective plant is detected;

reading, from the stack or the queue, one of the identification information corresponding to a field in a case where the request is received;

decreasing the number of the trays containing one or more defective plants in response to the reading of the identification information from the stack or the queue; and transmitting, to the terminal device, one or more captured image of plants in a field corresponding to the read identification information and the decreased number of the tray containing defective plant.

* * * * *